(12) United States Patent
Tabata et al.

(10) Patent No.: US 9,848,484 B2
(45) Date of Patent: Dec. 19, 2017

(54) POWER-SUPPLY APPARATUS

(71) Applicant: TOSHIBA MITSUBISHI-ELECTRIC INDUSTRIAL SYSTEMS CORPORATION, Chuo-ku (JP)

(72) Inventors: Yoichiro Tabata, Tokyo (JP); Yujiro Okihara, Tokyo (JP); Noriyuki Nakamura, Tokyo (JP); Shinichi Nishimura, Tokyo (JP)

(73) Assignee: Toshiba Misubishi-Electric Industrial Systems Corporation, Chuo-ku (JP)

( * ) Notice: Subject to any disclaimer, the term of this patent is extended or adjusted under 35 U.S.C. 154(b) by 28 days.

(21) Appl. No.: 15/022,798

(22) PCT Filed: Oct. 4, 2013

(86) PCT No.: PCT/JP2013/077032
§ 371 (c)(1),
(2) Date: Mar. 17, 2016

(87) PCT Pub. No.: WO2015/049782
PCT Pub. Date: Apr. 9, 2015

(65) Prior Publication Data
US 2016/0234921 A1 Aug. 11, 2016

(51) Int. Cl.
*H01J 37/32* (2006.01)
*H05H 1/46* (2006.01)
*H05H 1/24* (2006.01)
*C01B 13/11* (2006.01)
*H02M 7/48* (2007.01)
*H02M 1/00* (2006.01)

(52) U.S. Cl.
CPC ............. *H05H 1/24* (2013.01); *C01B 13/11* (2013.01); *H02M 7/48* (2013.01); *H02M 2001/0009* (2013.01); *H02M 2007/4815* (2013.01); *H05H 2001/4682* (2013.01); *Y02B 70/1441* (2013.01); *Y02P 20/121* (2015.11)

(58) Field of Classification Search
None
See application file for complete search history.

(56) References Cited

U.S. PATENT DOCUMENTS 6,143,256 A * 11/2000 Shinagawa ............. C01B 13/11
422/186.15
2010/0219757 A1* 9/2010 Benzerrouk ...... H01J 37/32009
315/111.51

FOREIGN PATENT DOCUMENTS

JP 53-122695 A 10/1978
JP 55-26032 A 2/1980
(Continued)

OTHER PUBLICATIONS

Office Action dated May 9, 2016 in Taiwanese Patent Application No. 103123296 (with partial English translation).
(Continued)

*Primary Examiner* — Dedei K Hammond
(74) *Attorney, Agent, or Firm* — Oblon, McClelland, Maier & Neustadt, L.L.P.

(57) ABSTRACT

A power supply apparatus includes a controller that performs the following action. The controller determines a target direct-current electric amount value in accordance with an external input. Then, the controller performs feedback control in such a manner that an amount of direct-current electric power input to an inverter reaches the target direct-current electric amount value.

12 Claims, 10 Drawing Sheets

(56) References Cited

FOREIGN PATENT DOCUMENTS

| JP | 8-322918 | A | 12/1996 |
|---|---|---|---|
| JP | 10-25104 | A | 1/1998 |
| JP | 3719352 | B2 | 11/2005 |
| JP | 2006-176372 | A | 7/2006 |
| JP | 4108108 | B2 | 6/2008 |

OTHER PUBLICATIONS

Office Action dated Jun. 21, 2016 in Japanese Patent Application No. 2015-540338 (with partial English language translation).
International Search Report dated Dec. 24, 2013 in PCT/JP2013/077032 filed on Oct. 4, 2013.
Taiwanese Office Action and Search Report dated Nov. 19, 2015 in Patent Application No. 103123296 (with English language translation).
International Preliminary Report on Patentability and Written Opinion dated Apr. 14, 2016 in PCT/JP2013/077032 (with English translation).
Office Action dated Mar. 9, 2017 in Korean Application No. 10-2016-7006910 (with partial English language translation).

\* cited by examiner

POWER-SUPPLY APPARATUS

TECHNICAL FIELD

The present invention relates to a power supply apparatus capable of outputting alternating-current electric power to a plasma generator (capacitive load apparatus) that can generate an ozone gas and a radical gas and controlling the output alternating-current electric power.

BACKGROUND ART

In general, a plasma generator being a capacitive load apparatus that generates a large amount of ozone gas and a large amount of radical gas includes a plurality of discharge cells connected in parallel. Each discharge cell includes a pair of electrodes opposed to each other to form a discharge space with a dielectric located between the electrodes. In recent years, a very-large-scale plasma generator is in increasing demand which includes laminations or blocks of a plurality of discharge cells connected in parallel. With a source gas being supplied in the discharge space in the plasma generator, a power supply apparatus applies an alternating-current high voltage between the discharge cells. The gas in the discharge space is excited by an electric field caused by the application of the voltage, generating a large amount of ozone gas and a large amount of radical gas.

The generated ozone gas and the generated radical gas often find use as a film deposition gas for a functional film such as an oxide insulating film or as a cleaning gas for components mainly in the semiconductor manufacturing field, the solar photovoltaic panel manufacturing field, and the flat display manufacturing field. In these fields which requires the ozone gas and the radical gas, these gases need to be supplied in large quantities and need to be supplied stably at high concentrations and high purities on a 24-hour basis while the amount and the concentrations of these gases that are generated and output need to be controlled stably and easily.

In general, loads driven due to the application of alternating-current voltage includes, besides a resistive (R) load such as a thermoelectric apparatus, an inductive (L) load such as a motor load and a capacitive (C) load associated with apparatuses that accumulate electric charges and apply a high voltage. Apart from the resistive (R) load such as the thermoelectric apparatuses, the inductive (L) load such as the motor load generally has constant impedance, and accordingly the electric power input increases in proportion to the increasing rate of voltage supplied from the power source to the load. Thus, the inductive load is relatively stable. In contrast, the capacitive load apparatus (C) such as a plasma generator is a nonlinear load that has inconstant impedance, which varies depending on the load conditions. Thus, it is very difficult to stably operate the plasma generator by supplying a voltage from the power supply apparatus. This is more likely to cause the breakage and the like of the discharge cell portion in the conventional plasma generator. It is therefore difficult to stably operate the plasma generator for a long period of time through the use of the voltage from the power supply apparatus.

The application of alternating current to a load being an inductive load or a capacitive load causes a phase lag or a phase lead of a load current Id relative to an applied load voltage Vd. Consequently, the ratio (load power factor $\eta d=PW/PQ$) of an actually supplied electric power capacity PQ ($=Vd \times Id$) to an active power PW supplied to the load becomes extremely small. Increasing the active power PW of a power supply apparatus having a small load power factor $\eta d$ requires the greater electric power capacity PQ ($=Vd \times Id$), and thus a very-large-scale power supply apparatus needs to be installed.

For a smaller power supply apparatus, a power factor improvement apparatus (power factor improvement means) has been known which is mounted on the output unit of the power supply apparatus for improvement of the power factor $\eta d$. The different power factor improvement apparatuses are provided for an inductive load and a capacitive load. The power factor improvement apparatus for the inductive load is a capacitor bank, which is provided to improve the L load. The power factor improvement apparatus for the capacitive load is a reactor, which is provided to improve the C load. The power supply apparatus works through the use of the inductive load (or the capacitive load) and the power factor improvement apparatus at around an alternating-current voltage frequency fc (resonance frequency) that creates the resonance state between the load and the power supply apparatus.

The resonance frequency fc is given by $fc = \frac{1}{2} \cdot \pi \cdot (L \cdot C)^{0.5}$ (hereinafter referred to as Expression (1)).

For the inductive load, substituting the capacitor bank being the power factor improvement apparatus into C of Expression (1) yields the resonance frequency fc. For the capacitive load, substituting the reactor Lp being the power factor improvement apparatus into L of Expression (1) yields the resonance frequency fc. The power supply apparatus works on a frequency range associated with the resonance frequency fc, whereby the power factor of the power supply apparatus is improved.

Patent Documents 1 to 3 are examples of the prior techniques for improving the power factor of the power supply apparatus that applies alternating-current electric power to the plasma generator being the capacitive load.

The power supply apparatus for alternating-current load disclosed in Patent Document 1 includes a transformer (inductor) for improving the power factor which is provided for a discharge load (discharge cell) that generates plasma.

The power supply apparatus for alternating-current load disclosed in Patent Document 2 includes a transformer (inductor) for improving the power factor which is provided for a discharge load (discharge cells) that generates plasma. Patent Document 2 discloses that the inverter circuit unit having the frequency control function allows for the power factor in the inverter output unit to be optimally controlled in the region in which greater electric power is input to the load. The power supply apparatus according to Patent Document 2 performs the frequency control to allow proper operation, during the occurrence of failure in one or some of the discharge cells, through the use of the remaining discharge cells.

According to the technique in Patent Document 3, in the plasma generator including a plurality of discharge cells, load de-energization fuses are provided for the respective discharge cells. According to the technique in Patent Document 3, any failure in a discharge cell causes a fuse provided correspondingly to the discharge cell to burn out, thus interrupting the electric power supplied to the discharge cell. Further, Patent Document 3 discloses the power supply apparatus for three-phase alternating-current loads and the system for improving the power factor by operating the power supply apparatus at a predetermined frequency around the resonance through the use of the load capacitance value and reactors, the predetermined frequency being fixed on the power supply apparatus side.

The respective power supply apparatuses according to the above-mentioned patent documents include, for the improvement of power factor, inductive inductances (reactors) each located between the output side of the power supply apparatus and the plasma generator.

PRIOR ART DOCUMENTS

Patent Documents

Patent Document 1: Japanese Patent No. 3719352
Patent Document 2: Japanese Patent No. 4108108
Patent Document 3: Japanese Patent Application Laid-Open No. 10-25104 (1998)

SUMMARY OF INVENTION

Problems to be Solved by the Invention

In supplying electric power to the plasma generator, it is important to ensure the stable supply of the electric power to the plasma generator. This is because the failure to stably supply the electric power would cause variations in, for example, the concentration of the gas generated in the plasma generator. For the stable supply of electric power, it is important to keep and control the amount of electric power input from the power supply apparatus to be constant with a high accuracy.

The conventional power supply apparatus for the capacitive load has used the load current or the inverter output current as the means for controlling the electricity amount of the load. If the load power factor varies depending on the load conditions, the phase of the current and the phase of the voltage associated with the inverter output and the load output change accordingly all the time, failing to provide proportional one-to-one correspondence for the detected load current or for the amount of electric power input to the load. It is therefore difficult to perform the feedback control on a proportional basis over the amount of electric power input to the load, and thus the electric power input has been variably controlled indirectly through the relative feedback control. In terms of the long-term stable operation of the plasma generator, the disturbance in the load and changes in the external setting conditions would be accompanied by changes in the plasma load conditions, and thus the constant electric power input supplied from the power supply apparatus would not be secured, failing to provide more reliable control over the apparatus.

The present invention therefore has an object to provide a power supply apparatus capable of keeping the amount of electric power input constant and stably supplying an plasma generator with the amount of electric power input in a system including the plasma generator and the power supply apparatus.

Means to Solve the Problems

To achieve the above-mentioned objective, a power supply apparatus according to the present invention is a power supply apparatus that outputs an alternating-current voltage to a plasma generator being a capacitive load including a plurality of discharge cells connected to one another. The power supply apparatus includes an inverter that converts direct-current electric power to alternating-current electric power, a controller that controls an action of the inverter, and a detection unit that detects direct-current electric power input to the inverter. The controller (A) determines a target direct-current electric amount value in accordance with an external input, and (B) performs feedback control on the basis of at least a direct current detected by the detection unit in such a manner that an amount of the direct-current electric power input to the inverter reaches the target direct-current electric amount value.

Effects of the Invention

The power supply apparatus according to the present invention is the power supply apparatus that outputs an alternating-current voltage to the plasma generator being the capacitive load including the plurality of discharge cells connected to one another. The power supply apparatus includes the inverter that converts direct-current electric power to alternating-current electric power, the controller that controls an action of the inverter, and the detection unit that detects direct-current electric power input to the inverter. The controller (A) determines the target direct-current electric amount value in accordance with the external input, and (B) performs the feedback control on the basis of at least a direct current detected by the detection unit in such a manner that the amount of the direct-current electric power input to the inverter reaches the target direct-current electric amount value.

Thus, the above-mentioned power supply apparatus performs the feedback control through the use of, for example, the direct current that is smaller than the load current or the like, and the direct current or the like and the amount of the direct-current electric power input to the inverter (in other words, the amount of electric power input) are in one-to-one correspondence. Thus, the power supply apparatus can control, with a high accuracy, the amount of electric power input to be constant at the target electric input amount value in accordance with the desired gas concentration. Unlike the load current and the like, the detected direct current and the like do not carry, for example, noises. Again, the amount of electric power input is thus controlled, with a high accuracy, to be constant at the target electric input amount value in accordance with the desired gas concentration. Thus, the power supply apparatus can continue to supply the plasma generator with the stable electric power.

These and other objects, features, aspects and advantages of the present invention will become more apparent from the following detailed description of the present invention when taken in conjunction with the accompanying drawings.

DESCRIPTION OF EMBODIMENTS

The present invention relates to a power supply apparatus that outputs an alternating-current voltage to a plasma generator being a capacitive load. The plasma generator includes a plurality of discharge cells connected to one another and is capable of generating an ozone gas and a radical gas at high purities and high concentrations. The capacitive power factor (load power factor) of the plasma generator is, for example, equal to or less than 50%. The output of each power supply apparatus under study falls within the range of, for example, 1 kW to 100 kW. The plasma generator under study works by the power supply from the power supply apparatus that provides an alternating-current output at a frequency in 10- to 60-kHz range.

Figure 1:
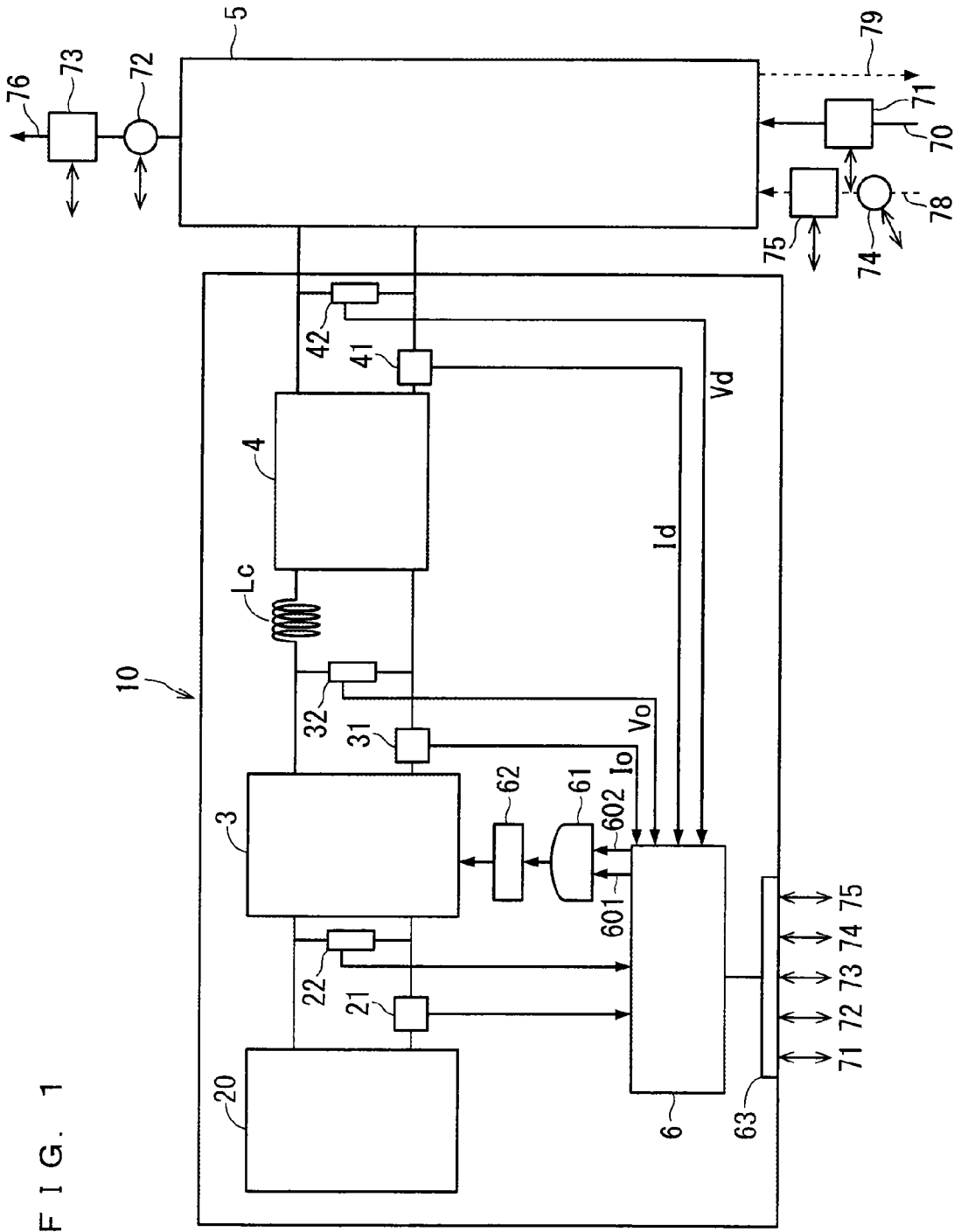
FIG. 1 A block diagram showing an inner structure of a power supply apparatus (10) according to the present invention and a plasma generator (5) connected to the power supply apparatus (10).

FIG. 1 is a block diagram showing a configuration of a system including the power supply apparatus and the plasma generator being a capacitive load.

With reference to FIG. 1, a plasma generator 5 is a capacitive load including a plurality of discharge cells connected in parallel. As described above, each discharge cell includes a pair of electrodes opposed to each other so as to form a discharge space therebetween. The electrodes are provided with a dielectric facing the discharge space. Typical examples of the plasma generator 5 include an ozone gas generator (ozonizer). In general, such an ozone generator has been mainly used in the industrial and manufacturing fields for the ozone sterilization in the field of water treatment and for the ozone breaching in chemical plants.

The plasma generator 5 is supplied with a source gas such as an oxygen gas. The flow rate of the source gas is controlled by a simple combination of a gas flowmeter and a gas flow valve. The gas pressure in the plasma generator 5 is adjusted through the use of an output gas valve of a gas outlet of the plasma generator 5. A refrigerant such as water is caused to flow in the plasma generator 5 to remove the heat generated in the discharge cells, thereby cooling the discharge cells. The flow rate of the refrigerant is adjusted by, for example, a water-cooled valve.

As described above, the gas flow rate, the gas pressure, the refrigerant flow rate, and the like are adjusted by, for example, simple valves, and accordingly may vary greatly relative to the set values of the gas flow rate, the gas pressure, and the refrigerant flow rate. As will be described below, it is important to regulate such variations in the physical quantities and to control and keep the physical quantities within predetermined values such that the plasma generator 5 can continue to operate stably.

As shown in FIG. 1, the plasma generator 5 is connected with a power supply apparatus 10 according to the present invention. The power supply apparatus 10 applies a high voltage alternating current being, for example, equal to or greater than 1000V to each discharge cell in the plasma generator 5. The application of voltage between the electrodes of the discharge cell through the dielectric and the discharge space causes a high-field discharge in the discharge space. This discharge excites the source gas supplied in the discharge space. Then, a plasma photochemical reaction occurs to generate a plasma gas, such as an ozone gas and a radical gas, from the source gas.

The power supply apparatus 10 is capable of outputting, to the plasma generator 5, a variable alternating current which ranges, for example, from 0 to 4000 W.

The following specifically describes the power supply apparatus 10 according to the present invention with reference to the drawings describing embodiments of the invention.

Embodiment 1

With a view toward protecting the load against a short circuit, the power supply apparatus 10 according to the present embodiment includes, in place of fuses for the respective discharge cells, a protection coordination function that protects the load against a short circuit occurring downstream from the inverter output unit. The power supply apparatus 10 is configured to interrupt the inverter output voltage in a very short period of time when any abnormality is encountered. Thus, the power supply apparatus 10 according to the present embodiment is ready to manage failures. Further, the power supply apparatus 10 according to the present embodiment indicates a faulty part in the event of a failure. This indication helps the user to restore the malfunctioning power supply apparatus 10 in a short period of time.

As shown in FIG. 1, the power supply apparatus 10 includes a direct-current voltage output unit 20, an inverter 3, and a transformer 4.

The direct-current voltage output unit 20 may be a direct-current converter that converts commercial alternating-current electric power supply into a direct-current voltage and outputs the direct-current voltage or may be a direct-current battery that outputs the accumulated direct-current voltage. The direct-current converter receives an input of single-phase or three-phase commercial alternating-current electric power supply (for example, 200V) from the outside, rectifies the alternating-current voltage, coverts the voltage into a direct-current voltage, and outputs the boosted direct-current voltage. The direct-current battery boosts the direct-current voltage output form battery cells in multistage connection up to a predetermined direct-current voltage, and then outputs the boosted direct-current voltage.

The direct-current voltage output unit 20 is connected with the inverter 3 located downstream therefrom. The direct-current voltage output from the direct-current voltage output unit 20 is converted into a high-frequency alternating-current voltage in the inverter 3, and then the inverter 3 outputs the high-frequency alternating-current voltage.

The inverter 3 is connected with the transformer 4 located downstream therefrom. The transformer 4 boosts the high-frequency alternating-current voltage output from the inverter 3 up to a voltage that can induce discharge in the plasma generator 5. The transformer 4 is connected with the plasma generator 5 located downstream from the transformer 4. The transformer 4 applies the boosted high-frequency alternating-current voltage to the plasma generator 5 being a capacitive load.

Provided in the power supply apparatus 10 is a controller 6 that controls the action of the inverter 3. Through the control by the controller 6, the system shown in FIG. 1 can be driven stably, promptly stop operating in the event of a failure, and promptly handle the failure, allowing the power supply apparatus 10 to operate stably for a long period of time.

Provided between inverter 3 and the transformer 4 in the power supply apparatus 10 is a current-limiting reactor Lc that regulates a short-circuit current. The current-limiting reactor Lc provides the protection coordination in the power supply apparatus 10 in the event of a short circuit occurring in a load located downstream from the output unit of the inverter 3, prevents damages on the switchboard and the like located outside the power supply apparatus 10, and prevents failures of main components of the power supply apparatus 10, and accordingly the power supply apparatus 10 can promptly shut off the power supply.

In the conventional plasma generator, an inductive load located immediately downstream from the inverter output of the power supply apparatus for alternating-current load is capacitive, and thus the main components of the power supply apparatus as well as the discharge cells may be broken. Such a breakage is mainly caused by a flow of great inrush current (load capacitor current), the concentration of discharge in a part of the discharge cell surface, and the abnormal discharge occurring outside the discharge cell portion. Thus, according to the technique in Patent Document 3, each discharge cell is provided with a protective fuse. According to the present invention, instead of the protective fuse, the current-limiting reactor Lc for current regulation is disposed on the output side of the inverter 3. Further, the pulse width of the inverter 3 is controlled, and accordingly the load current and the load voltage are managed to prevent the concentration of discharge in a part of the discharge cell surface. The output of the power supply apparatus is accordingly controlled to regulate a short-circuit current in the event of a short circuit in the load and supply a stable alternating-current voltage to the load side for a long period of time.

Provided on the output side of the inverter 3 of the power supply apparatus 10 are detection units 31, 32, 41, and 42. The detection units 31 and 32 are disposed between the inverter 3 and the transformer 4. The detection unit 31 detects an output current Io from the inverter 3 and the detection unit 32 detects an output voltage Vo from the inverter 3. The detection units 41 and 42 are disposed between the transformer 4 and the plasma generator 5. The detection unit 41 detects the load current Id output from the transformer 4 and the detection unit 42 detects the load voltage Vd output from the transformer 4.

The detection units 31, 32, 41, and 42 continuously perform the detection action and transmit the detection results as signals to the controller 6. The controller 6 causes the inverter 3 to stop in response to the detection of any short circuit by the detection units 31, 32, 41, and 42. That is, the controller 6 determines the presence of short circuit on the basis of the detection results transmitted from the detection units 31, 32, 41, and 42. If the presence of short circuit is detected, the controller 6 sends a gate shut-off signal to an inverter drive circuit 62 through a logic circuit 61. Consequently, the output from the inverter 3 can be stopped. The controller 6 transmits to the logic circuit 61, a drive signal (f: drive pulse cycle of the inverter 3=1/f, τ: (output) pulse width of the inverter 3).

Thus, in the event of a short circuit in the load, the output from the inverter 3 is stopped in about microseconds. Further, the controller 6 indicates (makes a notification of) an abnormal spot causing a short circuit, thus enhancing the stable stopping function performance of the power supply apparatus for alternating-current load.

Figure 2:
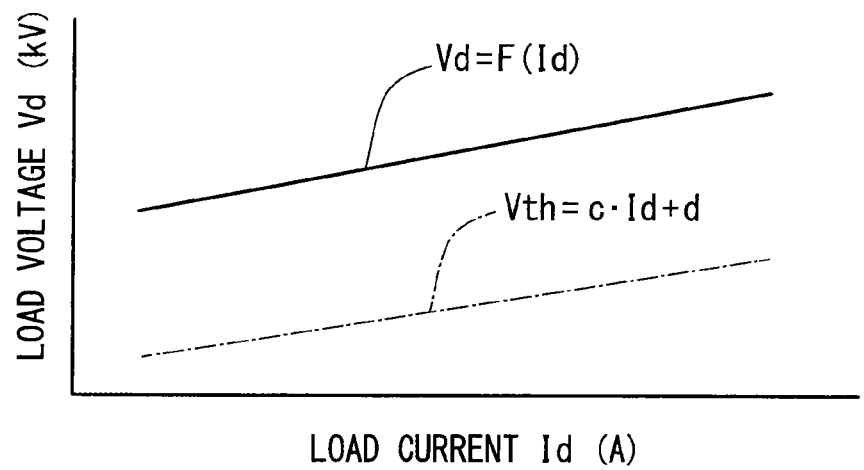
FIG. 2 A characteristic diagram for describing an action of the power supply apparatus (10) according to an embodiment 1.

Specifically, the load voltage Vd of the plasma generator 5 during normal operation usually has the characteristics that are dependent on the load current Id shown in FIG. 2. That is, the load voltage Vd is expressed by Vd=f(Id) (the solid line in FIG. 2) and the plasma generator 5 is driven while keeping the load voltage Vd. In the event of an abnormality in the plasma generator 5, however, the plasma generator 5 fails to keep operating at the load voltage Vd, and accordingly an extremely low voltage is detected.

Thus, an approximate predetermined voltage Vth is set for the controller 6, the approximate predetermined voltage Vth being equal to or smaller than, for example, about 0.3 times the load voltage Vd and being expressed by Vth=c×Id+d (c, d: constants, the alternate short and dashed lines in FIG. 2). Here, provided between the transformer 4 and the plasma generator 5 are the current detector 41 and the voltage detector 42. The detectors 41 and 42 continuously detect the current value and the voltage value supplied to the plasma generator 5.

Assume that the current detector 41 detects a current value Id1 and V1 denotes a voltage detection value detected by the voltage detector 42 when the current value Id1 is detected. Then, assume that the controller 6 receives the respective detection values Id1 and V1 and determines that the voltage detection value V1 is equal to or smaller than the predetermined voltage Vth (=c×Id1+d).

In this case, the controller 6 determines the occurrence of abnormalities in the plasma generator 5 (the occurrence of short circuit on the input side of the plasma generator 5), and accordingly the controller 6 transmits a gate shut-off signal for stopping the output from the inverter 3. The logic circuit 61 receives the above-mentioned drive signal (f, τ) and the gate shut-off signal, and then outputs, to the inverter drive circuit 62, the gate shut-off signal being the logic result. Then, the output from the inverter 3 is stopped on the basis of the gate shut-off signal. In the above-mentioned case, the controller 6 causes a display apparatus (not shown) to display the abnormalities to notify the occurrence of abnormalities in the plasma generator 5, so that the user is notified of the abnormalities.

Meanwhile, the voltage Vo output from the inverter 3 is the voltage on the primary side of the high-voltage transformer 4, and monitoring the voltage Vo allows the detection of abnormal conditions in the output load portion including the transformer 4.

Figure 3:
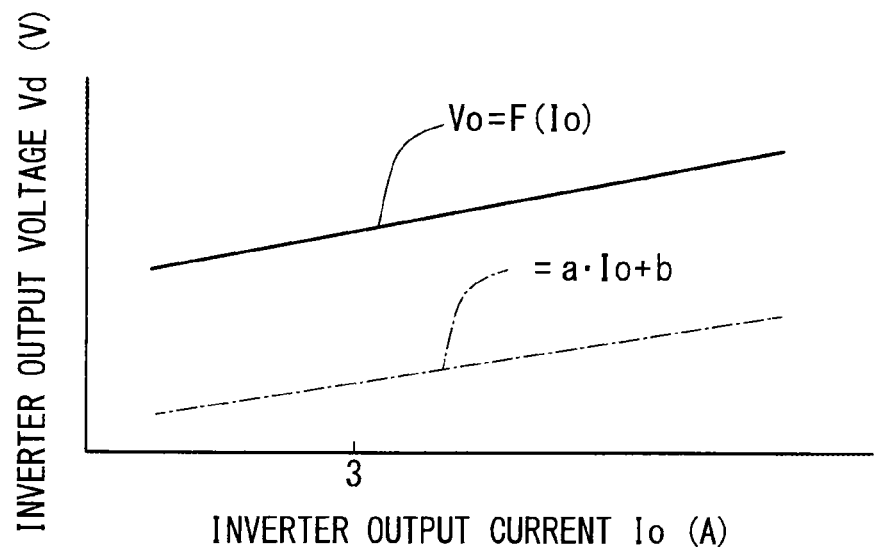
FIG. 3 A characteristic diagram for describing the action of the power supply apparatus (10) according to the embodiment 1.

The characteristics of the inverter output voltage Vo under the normal conditions are usually dependent on the inverter output current Io shown in FIG. 3. That is, the inverter output voltage Vo is expressed by Vo=f(Io) (the solid line in FIG. 2) and the power supply apparatus 10 is drive while keeping the inverter output voltage Vo. In the event of abnormalities in the plasma generator 5 or the transformer 4, however, power supply apparatus 10 fails to keep the inverter output voltage Vd, and accordingly an extremely low voltage is detected.

Thus, an approximate predetermined voltage V'th is set for the controller 6, the approximate predetermined voltage V'th being equal to or smaller than, for example, about 0.3 times the inverter output voltage Vo and being expressed by V'th=a×Io+b (a, b: constants, the alternate short and dashed lines in FIG. 3). Here, provided between the inverter 3 and the transformer 4 are the current detector 31 and the voltage detector 32. The detectors 31 and 32 continuously detect the current value and the voltage value output from the inverter 3.

Assume that the current detector 31 detects a current value Io2 and V2 denotes a voltage detection value detected by the voltage detector 32 when the current value Io2 is detected. Then, assume that the controller 6 receives the respective detection values Io2 and V2 and determines that the voltage detection value V2 is equal to or smaller than the predetermined voltage V'th (=a×lo+b).

In this case, the controller 6 determines the occurrence of abnormalities in the transformer 4 and/or in the plasma generator 5 (the occurrence of short circuit on the output side of the inverter 3), and accordingly the controller 6 transmits a gate shut-off signal for stopping the output from the inverter 3. The logic circuit 61 receives the above-mentioned drive signal (f, τ) and the gate shut-off signal, and then outputs, to the inverter drive circuit 62, the gate shut-off signal being the logic result. Then, the output from the inverter 3 is stopped on the basis of the gate shut-off signal. In the above-mentioned case, the controller 6 further causes the display apparatus (not shown) to display the abnormalities to notify the occurrence of abnormalities on the output side of the inverter 3, so that the user is notified of the abnormalities.

As described above, the power supply apparatus 10 includes the current-limiting reactor Lc provided at the output unit of the inverter 3, and accordingly any failure (short circuit) can be handled (a short-circuit current can be regulated). The current-limiting reactor Lc with an inductance of about 20 μH to several hundred μH can regulate an extremely great short-circuit current in the event of a short circuit occurring downstream from the output unit of the inverter 3. Thus, the current-limiting reactor Lc not only prevents failures of the power supply apparatus 10 but also allows the power supply apparatus 10 to serve as a safe power supply that provides the protection coordination.

If the power supply apparatus 10 provides insufficient protection coordination, any failure such as a short circuit in the system shown in FIG. 1 can turn off the breaker of the switchboard for the entire factory in which the system is installed. According to the present invention, meanwhile, the power supply apparatus 10 includes the current-limiting reactor Lc mentioned above, and accordingly such an outcome can be avoided.

The electric capacitance of the current-limiting reactor Lc increases with the square of the output current value of the inverter 3 (=2·π·f·L·I²). In a case where the load is capacitive, the voltage applied to the current-limiting reactor Lc is boosted relative to the output voltage of the inverter 3. Thus, the electric capacitance of the current-limiting reactor Lc increases greatly as a reactor value L of the current-limiting reactor Lc increases, resulting in an expansion the entire outline of the power supply apparatus 10 and an increase in the weight of the power supply apparatus 10. With a view toward reducing the size and the weight of the power supply apparatus 10 according to the present invention that supplies power to the plasma generator 5 including a plurality of discharge cells, the reactor value L of the current-limiting reactor Lc disposed in power supply apparatus 10, in particular, is preferably set within the range of about 20 μH to 70 μH.

The power supply apparatus 10 has the function of stopping the output from the inverter 3 by making quick decisions in the event of a short circuit, thus allowing for a quick recovery. That is, the power supply apparatus 10 stops supplying power and makes a notification of the spot in which the abnormality has occurred, whereby the power supply can be promptly resumed.

Meanwhile, the load conditions of the plasma generator 5 varies depending on the electric power supplied to the plasma generator 5, the supplied gas flow rate of the source gas, the gas pressure in the plasma generator 5, and the temperatures of the discharge cells. The control described below is therefore important for the stable generation of the desired amount of ozone and the like in the desired concentrations by the plasma generator 5 through the use of plasma. That is, the plasma generator 5 is controlled from the power supply apparatus side to regulate, within a given accuracy range, the supplied gas flow rate of a source gas 70 supplied to the respective discharge cells, the gas pressure in the plasma generator 5, the flow rate of a refrigerant 78 supplied and circulated in the plasma generator 5 to cool the discharge cells, the temperature associated with the refrigerant, and the concentration of a gas 76 output from the plasma generator 5. This control allows the plasma state generated in the plasma generator 5 to work in the stable region, and accordingly allows the plasma generator 5 to operate stably.

Provided on the plasma generator 5 side are a gas flow rate adjuster 71 capable of measuring and adjusting the supplied gas flow rate of the source gas 70, a gas pressure adjuster 73 capable of measuring and adjusting the gas pressure in the discharge cells, a refrigerant temperature adjuster 74 capable of measuring and adjusting the temperature of the refrigerant 78 supplied and circulated in the plasma generator 5, a refrigerant flow rate adjuster 75 capable of measuring and adjusting the flow rate of the refrigerant, and a concentration detector (monitor) 72 capable of measuring the concentration of the gas 76 generated in plasma generator 5 (see FIG. 1).

The gas flow rate adjuster 71 adjusts the supplied gas flow rate of the source gas with an accuracy of, for example, ±5% (within a desired range) relative to the set gas flow rate. The gas pressure adjuster 73 adjusts the gas pressure in the discharge cells with an accuracy of, for example, ±5% (within a desired range) relative to the set gas pressure. The refrigerant temperature adjuster 74 adjusts the temperature of the refrigerant with an accuracy of, for example, ±10% (within a desired range) relative to the set refrigerant temperature. The refrigerant flow rate adjuster 75 adjusts the circulation flow rate of the refrigerant with an accuracy of, for example, ±10% (within a desired range). The concentration of the gas 76 generated in the plasma generator 5 is measured with an accuracy of, for example, ±2% (within a desired range). The respective items are controlled and managed within the above-mentioned ranges through the transmission and receipt of signals between the plasma generator 5 and the power supply apparatus 10, and accordingly the desired amount of the gas 76 in the desired gas concentration is output from the plasma generator 5.

The controller 6 transmits and receives, through an external signal interface 63 of the power supply apparatus 10 whenever necessary, the set value of the supplied gas flow rate set for the gas flow rate adjuster 71, the value of the supplied gas flow rate measured by the gas flow rate adjuster 71, the set value of the gas pressure set for the gas pressure adjuster 73, the value of the gas pressure measured by the gas pressure adjuster 73, the refrigerant temperature measured by the refrigerant temperature adjuster 74, the set value of the refrigerant flow rate set for the refrigerant flow rate adjuster 75, and the value of the refrigerant flow rate measured by the refrigerant flow rate adjuster 75. The amount of electric power output from the power supply apparatus 10 to the plasma generator 5 is controlled and managed through the transmission and receipt of the values. The plasma generator 5 accordingly generates and outputs the gas 76 with the stable flow rate and the stable concentration, and the above-mentioned physical quantities in the plasma generator 5 are monitored.

Here, the gas flow rate adjuster 71 and the refrigerant flow rate adjuster 75 may be, for example, mass flow controllers (MFCs) that control the gas flow rate with a high degree of accuracy. The gas pressure adjuster 73 may be, for example, an automatic pressure controller (APC) that controls the gas pressure to be constant all the time.

Further, provided on the plasma generator 5 side is the gas detector 72 that detects the gas concentration of the generated ozone gas and the flow rate of the ozone gas (see FIG. 1). The gas concentration and the gas flow rate detected by the gas detector 72 are also transmitted to the controller 6 through the external signal interface 63 whenever necessary.

According to the present embodiment, the controller 6 transmits and receives the supplied gas flow rate of the source gas (the set value signal and the detection value associated with the gas flow rate adjuster 71) and determines if the supplied gas flow rate falls within the above-mentioned desired range relative to the set gas flow rate while the power supply apparatus 10 controls the pulse width or the pulse frequency of the inverter 3 so as to output the electric power in accordance with the flow rate of the flowing gas and the concentration of the generated gas 76. The controller 6 determines whether the pressure in the discharge cells (the set value signal and the detection value associated with the gas pressure adjuster 73) falls within the above-mentioned desired range relative to the set gas pressure. The controller 6 determines whether the temperature of the refrigerant (the detection value associated with the refrigerant temperature adjuster 74) falls within the above-mentioned desired range relative to the set refrigerant temperature. The controller 6 determines whether the flow rate of the refrigerant (the set value signal and the detection value associated with the refrigerant flow rate adjuster 75) falls within the above-mentioned range relative to the set refrigerant flow rate). If the detection signals (detection values) are out of the respective desired ranges, the power supply apparatus 10 issues an abnormality signal to immediately stop the plasma generator 5 or performs, for example, the control over the pulse width of the inverter 3 to control the output electric power. This allows the monitoring for the stable operation of the plasma generator 5 such that the concentration of the generated gas does not fall outside the desired range.

For the above-mentioned determination, the following assumptions are made: the controller 6 detects that the supplied gas flow rate of the source gas (the detection value associated with the gas flow rate adjuster 71) falls outside the desired range relative to the set gas flow rate; the controller 6 detects that the pressure in the discharge cells (the detection value associated with the gas pressure adjuster 73) falls outside the desired range relative to the set gas pressure; the controller 6 detects that the temperature of the refrigerant (the detection value associated with the refriger-ant temperature adjuster 74) falls outside the desire range relative to the set refrigerant temperature; or the controller 6 detects that the flow rate of the refrigerant (the detection value associated with the refrigerant flow rate adjuster 75) falls outside the desired range relative to the set refrigerant flow rate.

In the respective cases, the controller 6 sends a gate shut-off signal 602 to the inverter drive circuit 62 through the logic circuit 61. Consequently, the output from the inverter 3 is immediately stopped. Here, the logic circuit 61 receives, from the controller 6, a drive signal (f: drive pulse cycle of the inverter 3=1/f, τ: pulse width of the inverter 3) 601.

Thus, in response to any abnormal physical quantity encountered in the plasma generator 5, the output from the inverter 3 is stopped in about microseconds. Further, the controller 6 causes the display apparatus (not shown) to display (notify) the occurrence of abnormality (which one of the physical quantities is abnormal) in the plasma generator 5. Thus, the user can immediately recognize that the above-mentioned physical quantity in the plasma generator 5 is abnormal.

In the present embodiment, the environmental conditions for the operation of the plasma generator 5 are kept constant. Further, the power supply apparatus 10 adjusts the inverter 3 such that the power supply apparatus 10 can output the optimal amount of electric power in accordance with the physical quantities, such as the flow rate, the pressure, the temperature, and the like in the plasma generator 5 and immediately detects any abnormal physical quantities. In the event of abnormalities, the power supply apparatus 10 can stop the output from the inverter 3. In the event of abnormalities associated with the physical quantities, the power supply apparatus 10 makes a notification of the abnormalities, and accordingly the user can immediately recognize the abnormalities in the plasma generator 5. The abnormal conditions that can cause a short circuit in the load of the plasma generator 5, such as a sudden falloff in the gas flow rate, a sudden falloff in the pressure in the discharge cells, a reduction in the amount of cooling water, an increase in the temperature of the cooling water, are monitored on the power supply apparatus 10 side. Thus, factors responsible for instabilities in the plasma generator 5 can be found in advance, and accordingly the power supply apparatus 10 is controlled to avoid abnormalities associated with a short circuit in the load and abnormal conditions associated with overvoltage.

Figure 4:
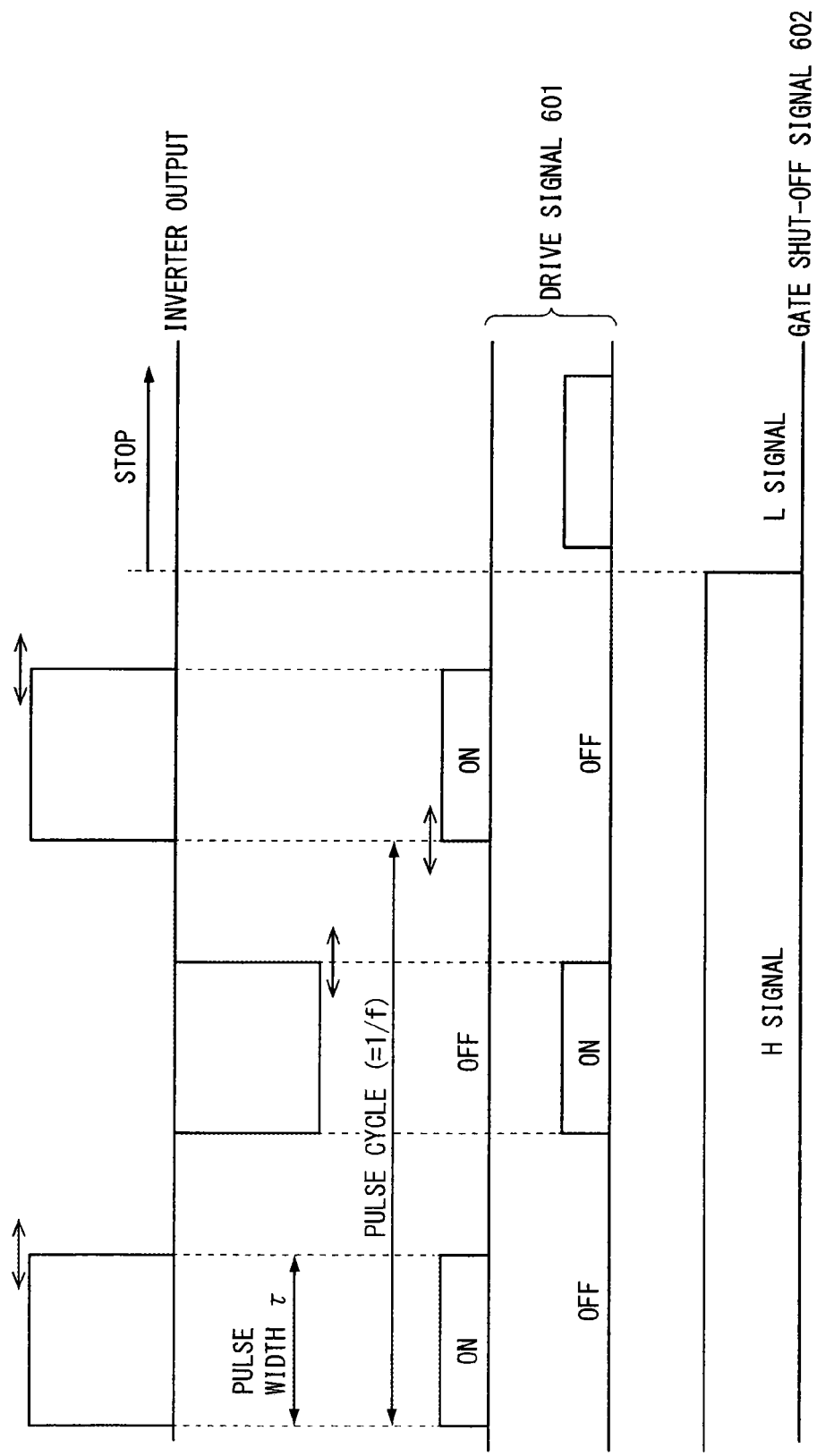
FIG. 4 A diagram showing signals input to an inverter (3) and waveforms output from the inverter (3).

With reference to FIG. 4, the following describes the outputting of a drive signal 601 and the gate shut-off signal 602 from the controller 6 to the logic circuit 61 and how the waveforms output from the inverter 3 change in accordance with the outputting. The ON-OFF signals for two gate signals are respectively shown in the second and third columns in FIG. 4. The two signals are combined to provide one drive signal 601.

The controller 6 transmits, to the logic circuit 61, the drive signal (the gate signals, ON-OFF signals) 601 that directly drives the inverter 3. The drive signal is shown in the second and third column in FIG. 4. The logic circuit 61 provides, on the basis of the drive signal, the drive pulse cycle (1/f) and the pulse width τ of the inverter 3 as instructions to the inverter drive circuit 62 that drives the inverter 3. The inverter drive circuit 62 that have received the instructions drives the inverter 3 in accordance with the drive pulse cycle (1/f) and the pulse width τ (see the first column (the top column) in FIG. 4).

The above-mentioned action is performed while the gate shut-off signal (the bottom column in FIG. 4) 602 is the H signal (normal). In a case where the gate shut-off signal 602 is the L signal (in the event of an abnormality), the logic circuit 61 transmits, to the inverter drive circuit 62, the instructions to stop the inverter 3 regardless of the inputting of the drive signal. The inverter drive circuit 62 that have received the instructions stops the output from the inverter 3. As described above, the output from the inverter 3 can be stopped in about microseconds if the gate shut-off signal 602 is the L signal.

Normally, the waveforms associated with the drive pulse cycle (1/f) and the pulse width τ are output from the inverter 3, and then the power supply apparatus 10 supplies high-frequency and high-voltage electric power to the plasma generator 5 on the basis of the waveforms. The supplied gas flow rate, the gas pressure, the refrigerant flow rate, and the refrigerant temperature in the plasma generator 5 fall within the desired ranges, thus allowing for the stable operation of the plasma generator 5.

The transmission and receipt of the setting signals and the detection signal values associated with the supplied gas flow rate, the gas pressure, the refrigerant flow rate, the refrigerant temperature, and the like are performed between the plasma generator 5 and the power supply apparatus 10. This allows for the stable operation of the plasma generator 5. Thus, to supply the optimal electric power to plasma generator 5, the power supply apparatus 10 performs the feed-forward control and the feedback control over the pulse width and the pulse frequency of the inverter 3 in accordance with the setting signals and the detection signal values.

Embodiment 2

As described below, the power supply apparatus 10 according to the present embodiment has a configuration that is based on the parallel resonance and highly resistant to load variations.

For the capacitive load such as the plasma generator 5, the phase of the current is approximately 90° leading relative to the phase of the voltage waveform. Although the electric capacitance supplied to the plasma generator 5 is extremely great, the stable inputting of energy to the plasma generator 5 can be achieved only if the active power is in the range of about ⅕ to 1/10 of the electric capacitance (the load power factor is in the range of about 10% to 20%). Therefore, the power supply apparatus 10 has been in need of an extremely large electric capacity. Here, the inductive reactor is disposed for the power factor improvement associated with the load power factor of the power supply apparatus 10 (to create the resonance state between the plasma generator 5 and the power supply apparatus 10).

In the present embodiment, the transformer 4 in the power supply apparatus 10 described in an embodiment 1 is a high-performance transformer that has the secondary-side magnetizing inductance more than five times as great as the leakage inductance. The inductance value is obtained by substituting the capacitance value and the working frequency of the plasma generator 5 into Expression (1) such that the resonance frequency (see Expression (1)) falls within the operating frequency range of the plasma generator 5. The calculated inductance value is given as the inductance value (hereinafter referred to as a transformer inductance value) obtained by combining the secondary-side magnetizing inductance and the leakage inductance of the transformer 4. Thus, the transformer 4 according to the present embodiment serves as the high-performance transformer that has the function of resonating with the load as well as the conventional functions including the voltage boosting function and insulating function and is dedicated to the plasma generator 5. The present embodiment is described below in detail.

Figure 5:
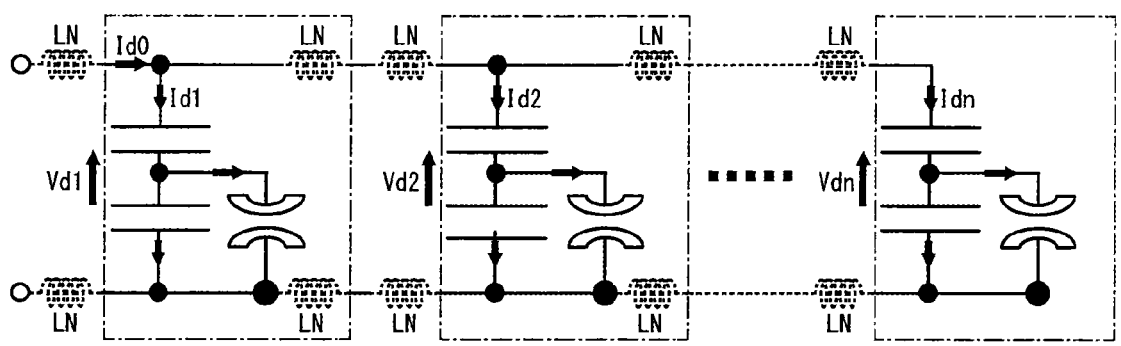
FIG. 5 A distributed equivalent circuit diagram showing the state of discharge cells connected in parallel in the plasma generator (5).
Figure 6:
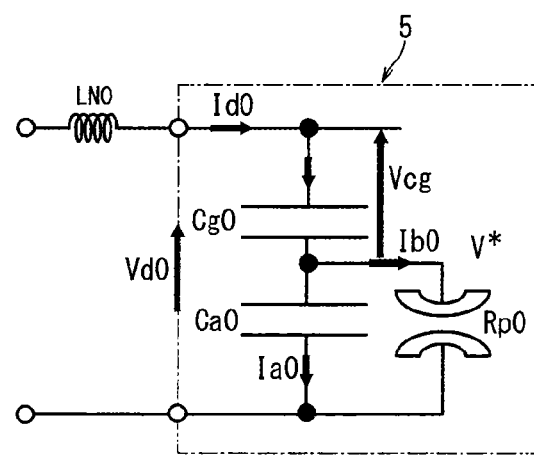
FIG. 6 A diagram showing an equivalent circuit obtained by combining the discharge cells connected in parallel in the plasma generator (5).

FIG. 5 is an equivalent circuit diagram showing a plurality of discharge cells connected in parallel in the plasma generator 5. FIG. 6 is an equivalent circuit diagram obtained by combining the plurality of discharge cells shown in FIG. 5. Assuming that the power supply apparatus 10 applies a load voltage Vd0 to the plasma generator 5 including the equivalent circuit shown in FIG. 6 and causes a load current Id0 to flow through the plasma generator 5, the actual current flowing through the respective discharge cells vary for the following reasons.

Assuming that the plurality of discharge cells are connected in parallel as illustrated in FIG. 5, wire inductance LN formed of a wire is present in the length portion of the wire. When the load voltage Vd0 is applied to the plasma generator 5, the voltage applied to the respective discharge cells varies due to the voltage reduction effect (or voltage boosting effect) caused by the current flowing through the wire and the wire inductance LN. Consequently, the current flows unevenly though the respective discharge cells. In a case where the plurality of discharge cells are connected in parallel, the variations in the electric power (current) input to the respective discharge cells become greater.

The relationship among the respective current values Id0, Id1, Id2, . . . , and Idn shown in FIG. 5 is expressed as Id0/n (n: the number of discharge cells)≠Id1≠Id2 . . . ≠Idn.

Further, the range of variation in the discharge cell current (Id1, Id2, . . . , and Idn) flowing through each discharge cell in the above-mentioned expression is greatly dependent on variations in, for example, the manufacturing accuracy and the setting conditions (such as the set value for the supplied gas flow rate of the source gas, the set value for the gas pressure in the discharge cell, the set value for the supplied amount of refrigerant, the set value for the temperature of the refrigerant, and the like) for each cell. In the plasma generator including the plurality of discharge cells connected in parallel, the discharge cell current flowing through each discharge cell greatly varies due to the wire inductance LN besides the manufacturing accuracy and the setting conditions for each discharge cell.

Assuming that the load voltage Vd0 is applied to the equivalent circuit shown in FIG. 6 (plasma generator 5), plasma load power Pw input to the plasma generator 5 is given by the following expression including the respective constants of the discharge cells but excluding the wire inductance LN.

$$Pw = \alpha \cdot V^* \cdot Ib0 = 4 \cdot Cg0 \cdot V^* \cdot f \cdot \{2^{0.5} \cdot Vd0 - (1 + Ca0/Cg0) \cdot V^*\} = [A \cdot F(Vd0) + B] \cdot f \quad \text{Expression (2)}$$

Here, the plasma discharge conduction ratio (<1.0) in the discharge space is denoted by a. The self-sustaining discharge voltage is denoted by $V^*$. As shown in FIG. 6, the total discharge plasma current is denoted by $Ib0$. As shown in FIG. 6, the dielectric capacitance value obtained by combining the capacitance values of the dielectric portions in the respective discharge cells is denoted by $Cg0$. The working frequency (kHz) of the high-frequency alternating-current voltage applied to the plasma generator 5 is denoted by $f$. As shown in FIG. 6, the discharge space capacitance value obtained by combining the capacitance values of the discharge space portions in the respective discharge cells is denoted by $Ca0$. It is indicated by $F(Vd0)$ that the value is the function dependent on the load voltage $Vd0$ applied between the discharge cells. A and B are constants determined by the plasma generator 5.

Figure 7:
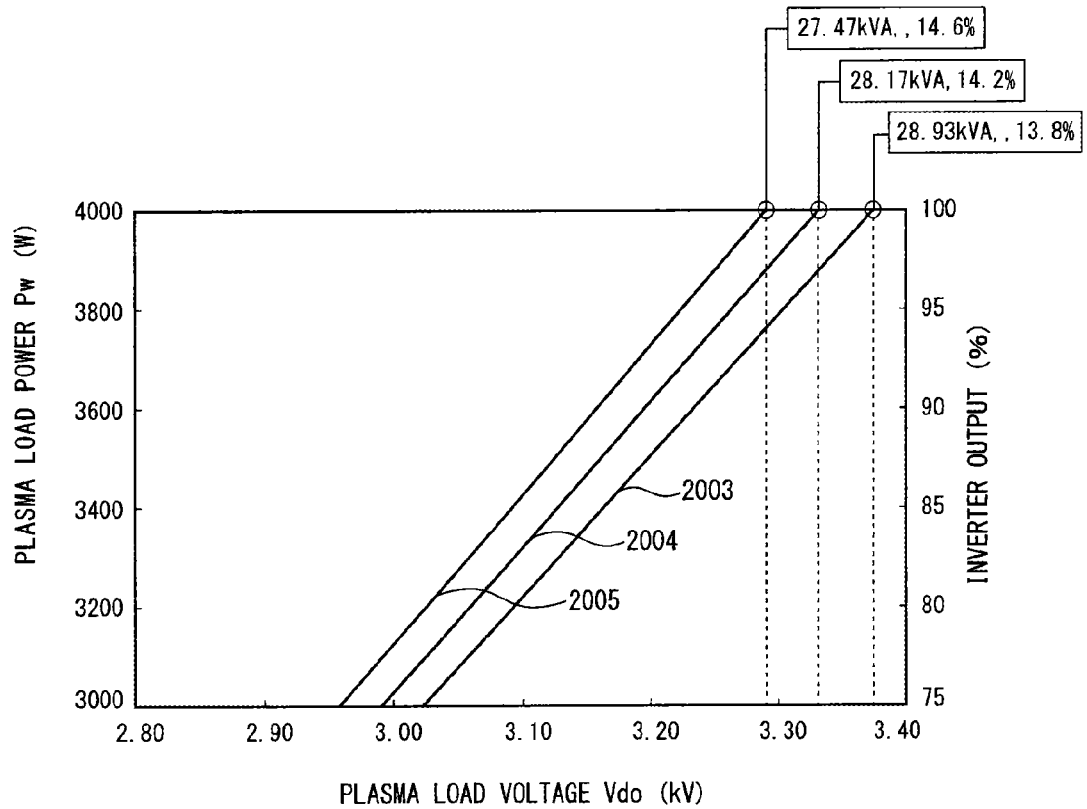
FIG. 7 A characteristic diagram for describing the power supply apparatus (10) according to an embodiment 2.

With the above-mentioned constants A and B and the frequency f being provided, the plasma load power Pw is uniquely given correspondently to the plasma load voltage Vd0 (kV) applied to the discharge cells. As shown in FIG. 7, the plasma load power Pw (W) has a characteristic of increasing linearly along with the plasma load voltage Vd0 (kV) according to the above-mentioned expression given for Pw.

With reference to FIG. 7, the vertical axis on the left indicates the plasma load power Pw (W), the vertical axis on the right indicates the inverter output (%) of the inverter 3 included in the power supply apparatus 10 that provides power supply to the plasma generator 5, and the horizontal axis indicates the plasma load voltage Vd0 (kV). With reference to FIG. 7, it is assumed that the frequency f is fixed to 15.5 kHz for a characteristic 2003, the frequency f is fixed to 16.0 kHz for a characteristic 2004, and the frequency f is fixed to 16.5 kHz for a characteristic 2005.

Figure 8:
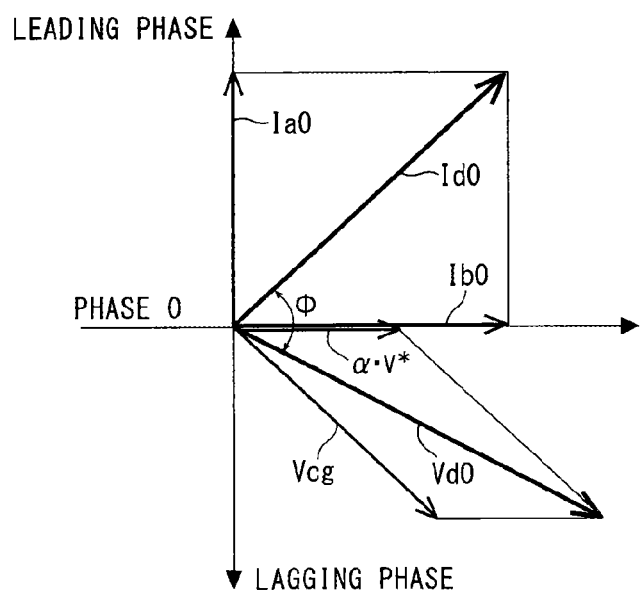
FIG. 8 A current-voltage vector diagram for describing the power supply apparatus (10) according to the embodiment 2.

Next, FIG. 8 is obtained by examining the phase vector of the plasma load voltage Vd0 applied to the plasma generator 5 and the phase vector of the total load current Id0 flowing through the plasma generator 5 shown in FIG. 6. The phase vector in FIG. 8 expresses, in the vector form, the voltage phase and the current phase applied to the respective portions of the discharge cells with reference to the phase vector for the self-sustaining discharge voltage V* applied to the discharge space in the equivalent circuit and the current (discharge current) Ib0 flowing through the discharge space.

With reference to FIG. 8, in the discharge space shown in the equivalent circuit in FIG. 6, an electric charge Q electrically charged through a dielectric capacitor Cg0 is discharged when the electric charge Q exceeds the self-sustaining discharge voltage V* in the discharge space, and then the discharge in the discharge space is immediately stopped in response to the discharge of the electric charge Q. Thus, in the discharge space, the intermittent discharge at the constant self-sustaining discharge voltage V* is repeated in the entire electrode surface.

The discharge impedance of the discharge portion in the discharge space is regarded as a pure resistive load Rp0 (see FIG. 6). Thus, there is no phase difference between the current (discharge current) Ib0 flowing through the discharge space and the self-sustaining discharge voltage V* corresponding to the discharge voltage, and accordingly the current Ib0 is in phase (zero phase) with the self-sustaining discharge voltage V*.

With reference to the vector diagram in FIG. 8, the state of 0° phase is indicated by the horizontal vector. The vector in which the phase is 90° leading is shown in the upward vertical direction. In contrast, the vector state in which the phase is 90° lagging is defined in the downward vertical direction.

With reference vector diagram in FIG. 8, assuming that the discharge current Ib0 flows while the phase is at 0° and the applied voltage is α·V*, a total capacitor current Ia0 flows through the space (1−α) in which no discharge takes place in the discharge space (through the capacitance Ca0 in the discharge space). Here, the phase of the total capacitor current Ia0 is 90° leading relative to the discharge current Ib0 at the phase zero. Then, as shown in the equivalent circuit in FIG. 6, the total load current Id0 is obtained by combining the vector of the discharge current Ib0 at the zero phase and the vector of the total capacitor current Ia0 at the phase that is 90° leading, and thus the total load current Id0 at the phase shown in FIG. 8 flows.

Next, the phase of a voltage Vcg applied across the total dielectric capacitance Cg0 of the dielectric in the discharge cell is defined as the phase that is 90° lagging relative to the total load current Id0 expressed by the vector. Thus, the voltage Vcg at the phase shown in FIG. 8 is applied.

The phase of the total load voltage Vd0 applied to the discharge cell is defined as the combined vector obtained from the voltage Vcg applied across the total capacitance Cg0 of the dielectric and the self-sustaining discharge voltage V* applied across the discharge space. Thus, the total load voltage Vd0 at the phase shown in FIG. 8 is applied.

It is clear from FIG. 8 that the phase difference of the total load current Id0 relative to the total load voltage Vd0 applied across the discharge cells is the leading load that is ϕ° leading (capacitive). On the basis of FIG. 8, the supplied electric power capacity PQ necessary for the discharge cells with respect to the discharge power Pw (=α·V*·Ib0) can be obtained by combining the vector of the total load current Id0 and the vector of the total load voltage Vd0 as in the following expression.

$$PQ = Id0 \cdot Vd0 \text{ (kVA)}$$

The supplied electric power capacity PQ becomes much greater than the discharge power Pw.

The load power factor (or the plasma load power factor) ηd (=Pw/PQ×100) in the plasma generator 5 shown in FIG. 6 is the leading load that is leading at a very small percentage around several tens of percent. This has required the plasma generator 5 being the capacitive load to have an extremely great output capacity such that the plasma generator 5 can supply the predetermined discharge power Pw, resulting in the upsizing of the apparatus. The means for solving this problem is the power factor improvement means for improving the power factor of the load.

The inventors investigated the series-resonance mode power factor improvement means and the parallel-resonance mode power factor improvement means to find out the resonance mode that allows the stable operation of the plasma generator 5 being the capacitive load. That is, the inventors found out the resonance mode that can improve the power factor of the plasma generator 5 including a plurality of discharge cells connected in parallel by minimizing variations in the discharge electric power amount input into the respective discharge cells. This will be specifically described below.

Figure 9:
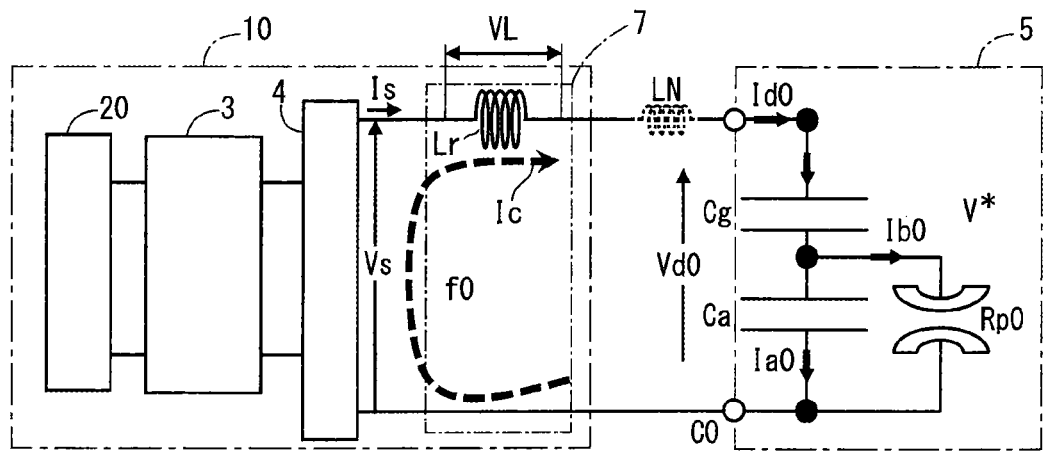
FIG. 9 A diagram showing a circuit for describing the power supply apparatus (10) according to the embodiment 2.
Figure 10:
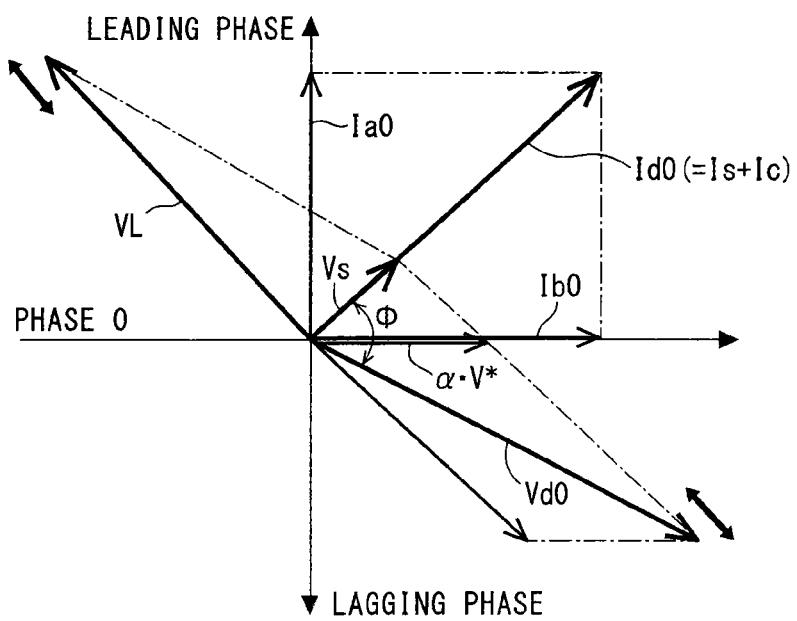
FIG. 10 A current-voltage vector diagram for describing the power supply apparatus (10) according to the embodiment 2.

FIG. 9 is a diagram showing the series-resonance mode power factor improvement means. With reference to FIG. 9, the plasma generator 5 shown in FIG. 6 is connected with the power supply apparatus 10 described in the embodiment 1. The power supply apparatus 10 includes a load resonance transformer 7 provided, in series, at the output unit of the transformer 4 of the power supply apparatus 10. FIG. 10 is a diagram showing the vector characteristics associated with the case in which the series-resonance mode.

Figure 11:
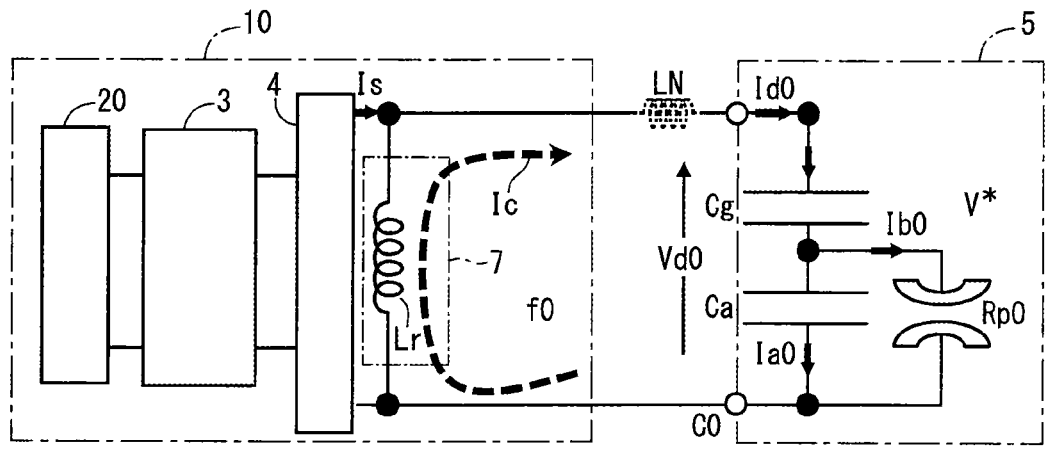
FIG. 11 A diagram showing a circuit for describing the power supply apparatus (10) according to the embodiment 2.
Figure 12:
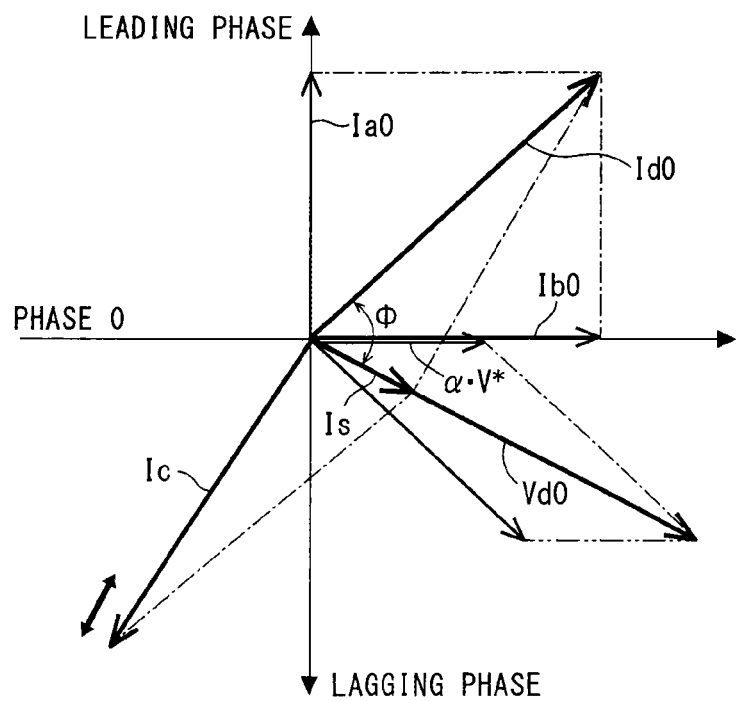
FIG. 12 A current-voltage vector diagram for describing the power supply apparatus (10) according to the embodiment 2.

FIG. 11 is a diagram illustrating the parallel-resonance mode power factor improvement means. With reference to FIG. 11, the plasma generator 5 shown in FIG. 6 is connected with the power supply apparatus 10 described in the embodiment 1. The power supply apparatus 10 includes the load resonance transformer 7 provided, in parallel, at the output unit of the transformer 4 of the power supply apparatus 10. FIG. 12 is a diagram showing the vector characteristics associated with the case in which the parallel-resonance mode is employed.

As shown in FIG. 9, the power supply apparatus 10 in the series-resonance mode includes, as the load resonance transformer 7, a reactor Lr provided in series with the transformer 4. As shown in FIG. 9, in a case where the load is capacitive and there is a phase difference between the total load voltage Vd0 and the total load current Id0, a reactive current (reflection current) Ic as well as a current Is supplied from the power supply apparatus 10 flows backward through the transformer 4 (see the broken line in FIG. 9). Here, the reactive current Ic is the current flowing backward from the plasma generator (load) 5 side to the power supply apparatus 10 side.

The total load current Id0 (=Is+Ic) in which the reactive current Ic merges with the current Is supplied from the power supply apparatus 10 to the plasma generator 5 flows through the reactor Lr provided in series with the load. The total load current Id0 flows through the reactor Lr, thus inducing a reactor voltage VL across the reactor Lr. Naturally, the reactor voltage VL is the voltage that is 90° leading relative to the total load current Id0 shown in FIG. 8. That is, deducting the vector voltage of the reactor voltage VL from the vector voltage of the total load voltage Vd0 provides a vector voltage Vs, which is a transformer voltage Vs output from the transformer 4.

FIG. 10 is a diagram showing the vector characteristics associated with the power supply apparatus 10 in the series-resonance mode mentioned above. That is, the total load current Id0 output from the transformer 4 is in phase with the transformer voltage Vs that is the secondary voltage of the transformer 4, and accordingly the electric power capacity (=Id0·Vs) at the output unit of the transformer 4 is improved, approaching the plasma load power Pw (in other words, a power factor 11 at the output unit of the transformer 4 is improved, approaching 100%).

In the series-resonance mode, the value of the transformer voltage Vs is much smaller than that of the total load voltage Vd0 applied to the load, indicating that the series-resonance mode is the resonance mode in which the power supply output is subjected to the voltage amplification. In other words, the transformer voltage Vs is amplified up to the load voltage Vd due to the resonance reactor Lr provided in series with the discharge cell portion. In the series-resonance mode, assuming that the plurality of discharge cells are connected in parallel as shown in FIG. 5, the wire inductance LN between the discharge cells serves as a part of the series resonance function. With the plurality of discharge cells being connected in parallel, the voltage amplification degree varies depending on the magnitude of the wire inductance LN. This causes the load voltage Vd applied across the discharge cells to vary greatly, which may result in a wide range of variation in the amount of electric power input to the respective discharge cells.

Meanwhile, as shown in FIG. 11, the power supply apparatus 10 in the parallel-resonance mode includes, as the load resonance transformer 7, the reactor Lr provided in parallel with the transformer 4. As shown in FIG. 11, in a case where the load is capacitive and there is a phase difference between the total load voltage Vd0 and the total load current Id0, the reactive current (reflection current) Ic as well as the current Is supplied from the power supply apparatus 10 flows backward through the resonance reactor Lr (see the broken line in FIG. 11). Here, the reactive current Ic is the current flowing backward from the plasma generator (load) 5 side to the power supply apparatus 10 side.

The total load current Id0 (=Is+Ic) in which the reactive current Ic merges with the current Is supplied from the power supply apparatus 10 to the plasma generator 5 flows from the power supply apparatus 10 side toward the plasma generator 5. In the parallel-resonance mode, only the reactive current Ic flows through the reactor Lr provided in parallel with the transformer 4. The reactive current Ic flowing through the reactor Lr connected in parallel is the reaction current form the load side, and thus, the reactive current Ic is the current that is 90° lagging relative to the total load voltage Vd0 applied to the load side. That is, the vector current obtained by combining the total load current Id0 and the reactive current Ic is the current Is output from the transformer 4.

FIG. 12 is a diagram showing the vector characteristics associated with the power supply apparatus 10 in the parallel-resonance mode mentioned above. That is, the total load voltage Vd0 output from the transformer 4 is in phase with the current Is that is the output current from the transformer 4, and accordingly the electric power capacity (=Vd0·Is) at the output unit of the transformer 4 is improved, approaching the plasma load power Pw (in other words, the power factor 11 at the output unit of the transformer 4 is improved, approaching 100%).

In the parallel-resonance mode, the value of the output current Is from the transformer 4 is much smaller than that of the total load current Id0 flowing through the load, indicating that the parallel-resonance mode is the resonance mode in which the power supply output is subjected to the current amplification.

The inventors conducted the verification test on the series-resonance mode power supply apparatus 10 that supplies power to the plasma generator 5 including a plurality of discharge cells connected to one another and the parallel-resonance mode power supply apparatus 10 that supplies power to the plasma generator 5 including a plurality of discharge cells connected to one another, to thereby determine which one of the power supply apparatuses 10 can drive the plasma generator 5 more stably than the other one.

The results revealed that, with the power being supplied from the series-resonance mode power supply apparatus 10 to the plasma generator 5 mentioned above, the load failed to operate stably or some discharge cells were broken due to the following factors.

That is, as shown in FIG. 5, with the respective discharge cells being connected in parallel, the combined impedance and the total discharge plasma resistance Rp0 of the load decline in inverse proportion to n (the number of discharge cells), the load current increases in proportion to n, and the total load current Id0 varies in a wider range. Further, the wire inductance value LN in the connecting wire portions between the discharge cells cannot be disregarded. Thus, in the resonance mode based on the series-resonance mode, the wire inductance value LN provides the voltage amplification function to the load resonance transformer 7 (the reactor Lr) provided in series in the power supply apparatus 10. Thus, the variation range of the load voltage Vd subjected to the voltage amplification is broadened, and accordingly the plasma load power Pw is determined on the basis of the load voltage Vd applied to the discharge cells as in Expression (2). Consequently, the variations in the electric power capacity supplied to the respective discharge cells increase, which can cause the breakage of discharge cells in which a large electric power capacity is injected in the discharge cell portion.

In contrast, it was revealed that, with the power being supplied from the parallel-resonance mode power supply apparatus 10 shown in FIG. 11 to the plasma generator 5 mentioned above, the load was allowed to operate stably due to the following factors In the resonance mode based on the parallel-resonance mode, the voltage amplification function in the load portion is lowered, and accordingly the current amplification becomes predominant. The load voltage Vd applied to the discharge cells becomes substantially equal to the transformer voltage Vs. Even if the wire inductance value LN varies greatly, the voltage amplification degree associated with the wire inductance value LN becomes much smaller than the voltage amplification degree in the series-resonance mode due to the plurality of discharge cells. Thus, the variation range of the load voltage Vd applied to the respective discharge cells is very small. As a result, the variation in the electric power capacity supplied to the respective discharge cells is small, and accordingly power is supplied evenly, eliminating the factor in, for example, the breakage of some discharge cells caused by the concentration of a large electric power in the discharge cells.

That is, the total load voltage Vd0, which is kept constant, is applied to the reactor Lr provided in parallel with the transformer 4, providing the current amplification resonance mode in which the reactive current Ic reflected from the load side is used. This satisfies the condition for producing no voltage resonance associated with the wire inductance value LN in the connecting wire portions between the discharge cells. Thus, the wire inductance value LN and the load resonance transformer 7 (the reactor Lr) provided in the power supply apparatus 10 hardly interfere with each other, and accordingly the load voltage Vd applied to the respective discharge cells is kept substantially constant. The variation in the load voltage Vd is small, and accordingly the variation in the electric power capacity that is supplied to the respective discharge cell portions and is determined based on the plasma load power Pw in Expression (2) becomes small, producing the above effect.

It was also found that the series-resonance mode and the parallel-resonance mode coexist in the actual power supply apparatus 10 due to the configuration of the transformer 4, and the like. Thus, the inventors conducted tests to determine the suitable ratio between these resonances with a view toward operating the plasma generator 5 stably.

The results of the tests revealed the appropriate configuration, in which the parallel reactor component in the output portion of the power supply apparatus 10 is more than about five times as great as the series reactor component. Further, the transformer 4 is designed such that the function of the load resonance transformer 7 (or equivalently, the combined resonance reactor Lr for the transformer 4) is provided to the inside of the transformer 4, and therefore the transformer 4 according to the present invention serves as the transformer (high-performance transformer) dedicated to the plasma generator 5.

Figure 13:
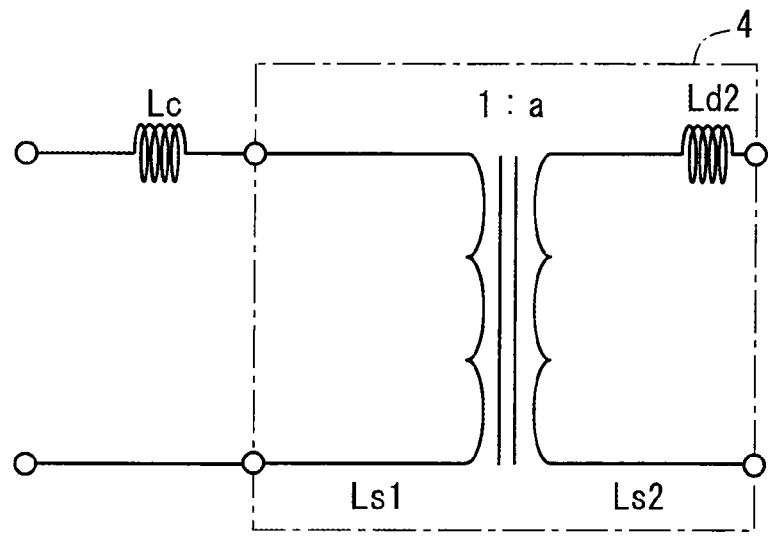
FIG. 13 A diagram showing a transformer equivalent circuit for describing the power supply apparatus (10) according to the embodiment 2.
Figure 14:
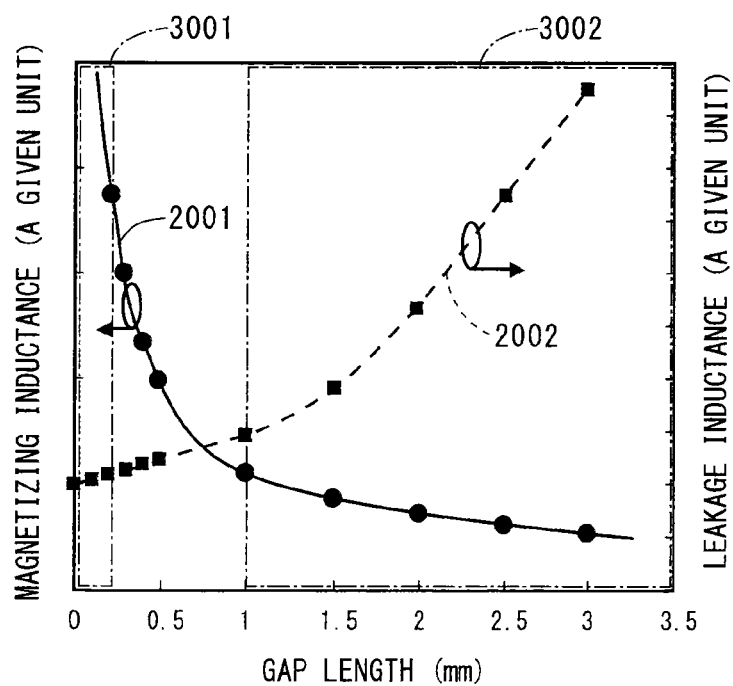
FIG. 14 A characteristic diagram for describing the power supply apparatus (10) according to an embodiment 4.

In the present embodiment, power supply apparatus 10 is provided in such a manner that the above-mentioned condition of the resonance ratio is satisfied (or equivalently, the parallel resonance becomes predominant). To be more specific, the new transformer 4 is provided in the present embodiment, the transformer 4 having the function of the load resonance transformer such that the above-mentioned condition of the resonance ratio is satisfied. FIG. 13 is a diagram showing a configuration of an equivalent circuit of the new transformer (the high-performance transformer) 4. FIG. 14 is a diagram showing the performance characteristic of the transformer 4.

With reference to FIG. 14, the vertical axis on the left indicates the magnetizing inductance (a given unit), the vertical axis on the right indicates the leakage inductance (a given unit), the horizontal axis indicates the transformer gap length (mm). A magnetizing inductance characteristic Ls2 converted on the secondary side of the transformer 4 is denoted by 2001. A leakage inductance characteristic Ld2 converted on the secondary side of the transformer 4 is denoted by 2002.

FIG. 13 illustrates the equivalent circuit of the new transformer 4 in addition to the current-limiting reactor Lc described in the embodiment 1. The magnetizing inductance component for forming a magnetic field on the primary-side transformer coil is denoted by Ls1. The leakage inductance component assumed on the basis of the coupling loss of the magnetic flux generated by the primary-side coil and the magnetic flux generated by the secondary-side coil is denoted by Ld2.

The load connected to the secondary side of the transformer is normally, for example, the inductive load such as a motor, a resistive load such as a thermoelectric apparatus, or the capacitive load such as the plasma generator according to the present invention. In general, the transformer is designed to be compatible with various loads mentioned above. That is, the normal transformer is optimally designed and produced under the condition that the reactive (reflection) current Ic is absent. Thus, the normal transformer is designed in such a manner that the magnetizing inductance component Ls1 is maximized in order to minimize the primary current for magnetization supplied from the primary side and that the leakage inductance component Ld2 is minimized in order to increase the degree of magnetic field coupling between the primary-side coil and the secondary-side coil.

Thus, the normal transformer is designed in such a manner that the transformer magnetic material core gap (the transformer gap length, hereinafter also referred to as the gap length) falls within a region 3001, thus being equal to or less than 0.2 mm (see FIG. 14).

As described above, in the normal transformer, the magnetizing inductance has been the inductance Ls1 formed on the primary side. In contrast, the new transformer 4 according to the present invention is designed in such a manner that, with attention being directed toward the above-mentioned reactive current Ic flowing to the secondary side of the transformer 4, the center of focus is the secondary-side magnetizing inductance Ls2 formed in the secondary-side of the transformer 4 by the reactive current Ic.

The present embodiment provides the parallel resonance effect to the secondary-side magnetizing inductance Ls2 of the transformer 4 and to the plasma generator 5 on the load side. Thus, the function of the load resonance transformer 7 can be provided inside the transformer 4, allowing the secondary side of the transformer 4 to perform the parallel resonance with the load.

Further, the new transformer 4 according to the present embodiment is based on the parallel resonance as described above. That is, the degree of parallel resonance associated with the relation between the magnetizing inductance Ls2 on the secondary side of the transformer 4 and a total capacitance C0 of the plasma generator 5 is set to be greater than the degree of series resonance associated with the relation among the leakage inductance Ld2 of the transformer 4, the current-limiting reactor Lc provided at the output unit of the inverter 3, and the total capacitance C0 of the plasma generator 5. In other words, in the transformer 4, the leakage inductance component Ld2 is minimized relative to the magnetizing inductance Ls2 on the secondary side. In particular, the transformer 4 in FIG. 13 designed to satisfy the relation in the following expression is the new transformer 4 according to the present embodiment.

magnetizing inductance on the secondary side Ls2>5·leakage inductance Ld2

That is, in the new transformer 4 according to the present embodiment, the secondary-side magnetizing inductance Ls2 is more than five times as great as the leakage inductance Ld2. The inductance value is obtained by substituting the capacitance value and the working frequency of the load into Expression (1) such that the resonance frequency (Expression (1)) falls within the working frequency range of the plasma generator 5. The calculated inductance value is given as the transformer inductance value.

Through the use of the transformer 4 that satisfies the above-mentioned condition with a view toward improving the power factor, the majority of the above-mentioned reactive current is caused to flow backward to the secondary-side magnetizing inductance of the transformer 4.

The secondary-side magnetizing inductance Ls2 is adjusted for the transformer 4 that fulfills the above-mentioned requirement. That is, the gap length of the transformer 4 needs to be greater than the gap length of the normally used transformer. After the inventors' consideration, it was found that the new transformer 4 according to the present embodiment is used with the appropriate gap length being equal to or smaller than 3.5 mm. With consideration given to the actual use of the transformer 4, it was found that the gap length of the transformer 4 is preferably equal to or greater than 1 mm. Thus, it is appropriate that the gap length of the new transformer 4 according to the present embodiment is set within the range of a region 3002 as shown in FIG. 14.

Here, the gap length of the transformer 4 may be greater than 3.5 mm if the relation of "magnetizing inductance Ls2 on the secondary side>5·leakage inductance component Ld2" is satisfied (see FIG. 14). In a case where the gap length of the transformer 4 is set to be greater than 3.5 mm, the leakage flux between the gaps increases, and accordingly this leakage flux may cause the problems such as the heat generation in the components of the power supply apparatus 10. With a view toward smoothly using the power supply apparatus 10, the gap length is desirably set to be equal to or smaller than 3.5 mm.

The electric capacitance of the power supply apparatus 10 is decreased in a case where the gap length of the transformer 4 is set to be smaller than 1 mm, the magnetizing inductance Ls2 is increased, and the resonance frequency in Expression (1) is set to be constant. However, the downsizing and the price reduction of the power supply apparatus 10 can be hardly achieved even if the power supply apparatus 10 having a small electric capacity is caused to resonate with the load. In view of the above-mentioned problems, the gap length of the transformer 4 according to the present invention is desirably set to be equal to or greater than 1.0 mm. This allows the input capacity of the power supply apparatus 10 to be equal to or greater than 1 kW.

In the present embodiment, to be precise, the working alternating frequency (resonance frequency) fc of the power supply apparatus 10 is obtained through circuit calculation on the basis of the inductance component of the current-limiting reactor Lc, the inductance components (such as the leakage inductance and the magnetizing inductance) of the new transformer 4 according to the present embodiment, and the total capacitance C0 of the plasma generator 5. The power supply apparatus 10 outputs high-frequency and high-voltage power at the calculated fc to the plasma generator 5 through the high-performance transformer 4. In particular, the controller 6 controls the inverter 3 to work at the resonance frequency fc and output a high-frequency voltage (more particularly, the pulse cycle of the inverter 3 is set and the output voltage is controlled on the basis of the pulse width of the inverter 3).

Here, fc is calculated from Expression (1) mentioned above. A combined inductance L0 obtained by combining the inductance component of the current-limiting reactor Lc mentioned above and the inductance components of the transformer 4 is denoted by L in Expression (1). In other words, the combined inductance L0 of the power supply apparatus 10 downstream from the output side of the inverter 3 is denoted by L in Expression (1). The combined capacitance C0 of the plasma generator 5 is denoted by C in Expression (1).

As described above, in the present embodiment, the transformer 4 has the secondary-side magnetizing inductance Ls2 more than five times as great as the leakage inductance Ld2. Thus, the power factor of the power supply apparatus 10 is improved based on the parallel resonance, allowing for the stable resonance action as well as the downsizing and the cost reduction of the power supply apparatus 10. The plasma generator 5 receiving power supply from the power supply apparatus 10 can accordingly work very stably.

The description in the present embodiment has been given on the case in which the secondary-side magnetizing inductance Ls2 of the high-performance transformer 4 is set to be more than five times as great as the leakage inductance Ld2 in the power supply apparatus 10 that includes the current-limiting reactor Lc and has the function of stopping in the event of any abnormality and the function of notifying abnormalities described in the embodiment 1.

This embodiment in which the secondary-side magnetizing inductance Ls2 is set to be more than five times as great as the leakage inductance Ld2 is applicable to the transformer 4 in the power supply apparatus 10 that does not include the current-limiting reactor Lc and does not have the function of stopping in the event of any abnormality and the function of notifying abnormalities described in the embodiment 1. This also provides the effect that the parallel resonance action can be performed stably. Similarly, the embodiment in which the secondary-side magnetizing inductance Ls2 of the transformer 4 is set to be more than five times as great as the leakage inductance Ld2 is applicable to the power supply apparatus 10 that includes the current-limiting reactor Lc but does not have the function of stopping in the event of any abnormality nor the function of notifying abnormalities.

Embodiment 3

In the embodiment 1, the description has been given on the case in which the current-limiting reactor Lc is disposed between the output unit of the inverter 3 and the input unit of the transformer 4 (see FIG. 1). In the present embodiment, the inductance of the primary-side coil of the high-performance transformer 4 is also equipped with the function of the current-limiting reactor Lc. Thus, the physical components of the current-limiting reactor Lc can be omitted, and accordingly power supply apparatus 10 can be configured to include the main circuit that is formed exclusively of the direct-current voltage output unit 20, the inverter portion, and the high-performance transformer 4. The transformer 4 according to the present embodiment will be described below.

The primary-side leakage inductance and/or the primary-side magnetizing inductance of the transformer 4 takes over the inductance component of the current-limiting reactor Lc such that the transformer 4 is equipped with the function of the current-limiting reactor Lc. That is, the number of turns of the primary-side coil of the transformer 4 is adjusted such that the current-limiting reactor component is taken over by the primary-side leakage inductance and/or the primary-side magnetizing inductance.

For example, a magnetic flux φL being a part of a magnetic flux φ0 generated in the primary-side coil of the transformer 4 is caused to leak, and accordingly a magnetic flux φ2 linked to the secondary-side coil of the transformer 4 is reduced, which increases the primary-side leakage inductance of the transformer 4. The number of turns of the coil on the primary side is adjusted in such a manner that the amount of increase in the primary-side leakage inductance is the current-limiting reactor component.

Thus, in the present embodiment, the transformer 4 is equipped with the function of the current-limiting reactor. The physical components of the current-limiting reactor Lc can be accordingly omitted and the short-circuit current can be regulated by the transformer 4 alone.

Here, the transformer 4 described in the embodiment 1 may be equipped with the function of the current-limiting reactor or the transformer 4 described in an embodiment 2 may be equipped with the current-limiting reactor 4.

Embodiment 4

The present embodiment relates to the improvement in capacity of the power supply apparatus 10 described in the embodiment 2. The power supply apparatus 10 according to the present embodiment is effective in supplying electric power to the plasma generator 5 having an increased capacity.

As described above, the common transformers installed in the power supply apparatuses are designed in such a manner that their specifications are compatible with various loads such as the inductive loads, the resistive loads, and the capacitive loads. Thus, the conventional transformer is designed with no consideration given to the voltage reflection (the reactive current) from the loads during driving of the power source and with emphasis on minimizing the heat loss of the transformer itself.

The conditions for the transformer core are determined in such a manner that the alternating electric power is supplied while the electric loss is regulated, with the magnetizing impedance on the primary side of the transformer being increased by maximizing the magnetizing inductance value of the transformer and minimizing the leakage inductance of the transformer. Thus, the conventional transformer has been designed in such a manner that the gap length is set to be zero or is reduced to a minimum (see the region 3001 in FIG. 14).

Operating these transformers connected in parallel (hereinafter referred to as parallel operation (of the transformers) has drawback of increasing variations in current flowing through the respective transformers due to the following reasons. The power supply apparatus in which the transformers each having a small capacity are connected in parallel has not been in use, and instead, the electric capacity of the power supply apparatus has been increased by upsizing one transformer.

That is, the normal transformer is designed as the universal transformer that is compatible with various loads. The normal transformer is thus designed to have an increased coil inductance (a very small gap length) with consideration given only to the flux coupling in the transformer. As indicated by the performance characteristic of the transformer in FIG. 14, the design is intended for the region 3001 in which the gap length of the transformer is small. Although the magnetizing inductance value is great in this region, the magnetizing inductance characteristic 2001 is very steep. In terms of production accuracy, the variation in the magnetizing inductance of the individual transformers is as great as, around ±25%. During the parallel operation of a plurality of conventional transformers, the variation width of the primary magnetizing current of the transformer varies by about 50% at maximum due to the variations in the magnetizing inductance of the individual transformers. Thus, the parallel operation of the conventional transformers results in increased variations in the current supplied to the individual transformers.

In the conventional transformer, the electric capacity transmitted to the secondary side of the transformer is dependent on the magnetizing current on the primary side. As described above, the variations in the current for the individual transformers cause a flow of current to concentrate in one of the transformers during the parallel operation of the transformers. The current concentration results in heat generation (heat loss) in the transformer itself. Thus, it is a common practice to avoid the parallel operation of the transformers.

In the present embodiment, meanwhile, the parallel operation of the transformers is enabled through the use of the transformers according to the embodiment 2 each having the function of improving the power factor. That is, the electric power to be transmitted to the individual transformers can be equally distributed even if the electric capacity supplied to the transformers is increased by the parallel operation of the transformers according to the embodiment 2.

In the present invention, the load is limited to the plasma generator 5 (or equivalently, the capacitive load). Thus, in the transformer 4 according to the embodiment 2, the reactive current Ic reflected from the load to the transformer 4 on the power supply apparatus 10 side is used to improve the power factor (see the embodiment 2). The electric power is accordingly distributed equally to the transformers provided in parallel.

Figure 15:
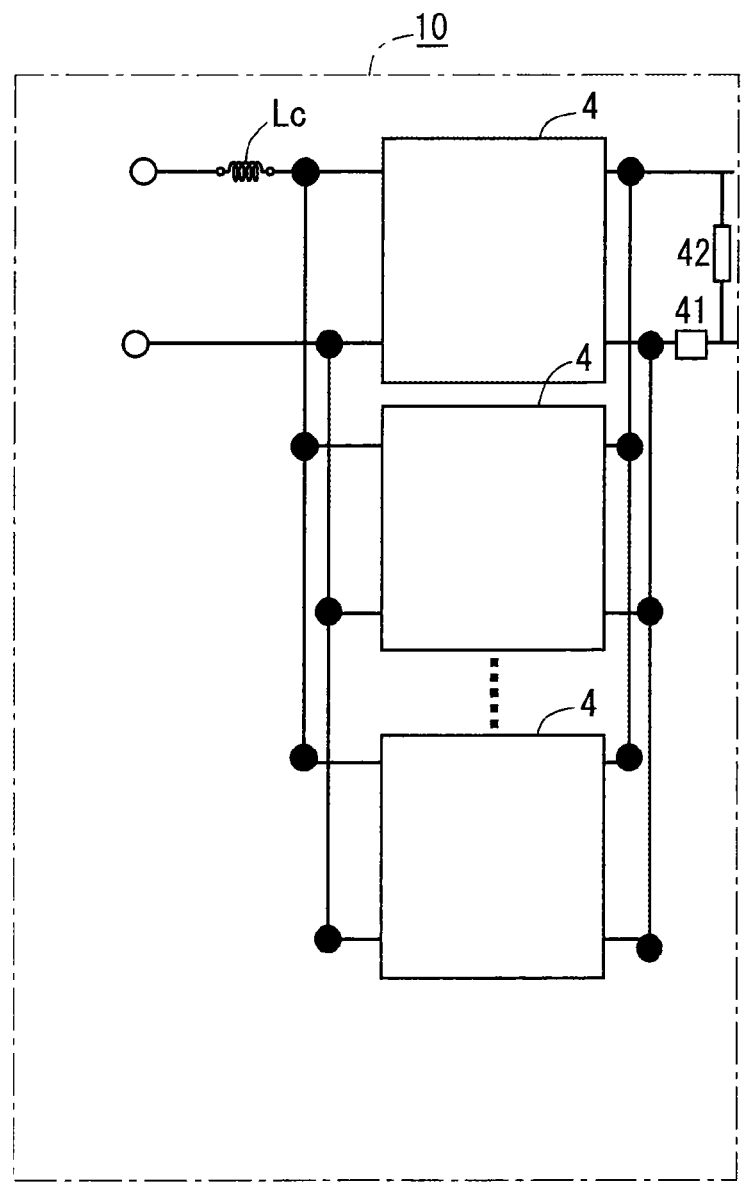
FIG. 15 A diagram showing the state in which a plurality of transformers (4) are connected in parallel.

FIG. 15 is a diagram showing the state in which the plurality of transformers 4 described in the embodiment 2 are connected in parallel. For the brevity of the drawing, FIG. 15 exclusively illustrates the plurality of transformers 4 disposed in the power supply apparatus 10 and the current-limiting reactor Lc. Unlike in FIG. 15, the current-limiting reactor Lc may be omitted or the transformer 4 may be equipped with the function of the current-limiting reactor Lc (see the embodiment 3). The transformer 4 is the high-performance transformer having the parallel resonance function described in the embodiment 2.

The parallel operation of the transformers 4 will be described below.

The transformers 4 are provided through the use of the magnetizing inductance on the secondary side provided by the reactive current Ic reflected from the load side. The current obtained by deducting the reactive current Ic from the current supplied to the primary side flows through the transformers 4, and then is supplied to the plasma generator 5. Consequently, the current that is supplied from the primary sides of the transformers 4 and flows through the individual transformers 4 (the active current alone obtained by excluding the reactive current Ic from the load) is small. The power factor of the load is improved only by this small current flowing thought the secondary-side coils of the transformers 4, thus preventing the transformers from further generating heat (losing heat).

For the normal transformer, a secondary load voltage Vd2 (kV) is uniquely given on the basis the ratio between the number of turns of the primary-side coil and the number of turns of the secondary-side coil. Meanwhile, as indicated by the following expression, the secondary-side load voltage Vd2 (kV) of the transformer 4 described in the present embodiment is determined on the basis of not only the ratio between the number of turns of the primary-side coil and the number of turns of the secondary-side coil but also the voltage value induced by the reactive current Ic reflected from the load side to the secondary-side coil. The induced coil voltage varies depending on the secondary-side magnetizing inductance value of the transformer 4 affected by the flow of the reactive current Ic. The induced voltage value is given by the following expression.

$$Vd2 = 2 \cdot \pi \cdot f \cdot Ls2 \cdot Ic$$

In the above expression, f indicates the resonance frequency, which is substantially equal to the working frequency because the power supply apparatus 10 works in this resonance frequency range. The secondary-side magnetizing inductance is denoted by Ls2.

The reactive current Ic flows to the individual transformers 4 in such a manner that the secondary-side load voltage Vd2 given by the above expression is kept constant even if the (secondary-side) magnetizing inductance of the transformers 4 varies due to the use of the plurality of transformers 4 connected in parallel (the transformers 4 are connected in parallel and Vd2 is therefore at the same potential for each of the transformer 4).

The high-performance transformer 4 described in the embodiment 2 allows for the improvement in the production accuracy of the secondary-side magnetizing inductance Ls2. As described in the embodiment 2, this improvement is achieved by the greater gap (about several millimeters) in the transformer 4. In particular, the production accuracy of the secondary-side magnetizing inductance Ls2 for transformer 4 according to the embodiment 2 is within a±3% range (see the region 3002 in FIG. 14).

The use of the transformers 4 according to the embodiment 2 can keep the variations in the magnetizing inductance Ls2 on the secondary side among the individual transformers 4 to a minimum. Consequently, there is substantially no variation in the reactive current Ic flowing through the individual transformers 4, and therefore the flow of the reactive current Ic is substantially equal for each of the transformers 4. The amount of electric power supplied from the primary side to the secondary side of the transformer 4 is equivalent to the active electric power alone obtained by excluding the amount of reactive electric power supplied to the load. In the individual transformers 4 connected in parallel, the primary-side voltage and the secondary-side voltage are at the same potential. Thus, the variations in the active electric power distributed among the individual transformers 4 fall within the variation accuracy for the inductance of the individual coil. The variations in the inductance of the individual coil of the high-performance transformer 4 fall within the above-mentioned production accuracy (about ±3%), and accordingly the active electric power transmitted from the primary sides to the secondary sides of the transformers 4 connected in parallel is substantially equal for each of the transformers 4. This prevents the thermal damage to the transformers 4.

As described above, through the use of the high-performance transformers 4 described in the embodiment 2, the parallel operation of the transformers 4 does not cause excessive heat generation in the transformers 4. Thus, the parallel operation of the transformers 4 can be performed and the capacity of the power supply apparatus 10 can be increased along with an increase in the capacity of the plasma generator 5.

Increasing the capacity through the use of one transformer results in not only the upsizing of the transformer but also a significant increase in cost. Meanwhile, the present embodiment allows for the parallel operation of the transformers 4, so that the power supply apparatus 10 can increase in capacity at low cost.

Embodiment 5

In some cases, the amount of electric power input from the power supply apparatus 10 (the amount of electric power input to the plasma generator 5 by the power supply apparatus 10) is made variable such that the concentration of gas such as the ozone gas generated by the plasma generator 5 can be changed. In general, the amount of electric power input and the concentration of gas are in one-to-one relationship that a gas of higher concentration is generated due to an increase in the amount of electric power input. The amount of electric power input varies within a range of 0 to 100% of the rated power of the power supply apparatus 10.

The following method, which is a prior technique, is an example of the control method for varying the amount of electric power input from the power supply apparatus 10 to obtain the desired electric power amount value and for steadily supplying (inputting) the desired electric power amount value to the load.

In particular, the high-frequency alternating load current Id0 supplied to the plasma generator 5 is usually detected. Then, the controller 6 changes the control signal of the inverter 3 (the inverter frequency for the pulse width τ of the inverter) such that the load current Id0 reaches the target current value (the current value which provides the desired electric power value). According to the control method, the alternating current waveforms of the inverter output from the inverter 3 are controlled based on the changed control signal.

According to the above-mentioned control method, the inverter 3 has been subjected to the feedback control system such that the load current Id0 reaches the target current value, with the amount of electric power input supplied from the power supply apparatus 10 not being regarded as the direct control amount but with the detected load current Id0 being regarded as the control amount. That is, in the above-mentioned control system, the amount of electric power input including the reactive electric power amount supplied from the power supply apparatus 10 has been variably controlled in an indirect manner.

According to the above-mentioned control method, an electric power input amount Pw needs to be calculated based on the following expression using: the effective load current Id0 having the load current waveforms detected by the detection unit 41 in FIG. 1; the effective load voltage Vd0 having the load voltage waveforms detected by the detection unit 42 in FIG. 1; and the load power factor ηd that is dependent on the amount of electric power input.

$Pw$=(effective load current $Id0$)×(effective load voltage $Vd0$)×(load power factor $\eta d$)=(load current $Id0$)×(effective load voltage $Vd0$)×cos φ

The load conditions vary depending on the load voltage applied to the plasma generator 5 and the amount of gas flow supplied to the plasma generator 5. It is therefore difficult to accurately obtain, all the time, the effective current value, the effective voltage, and a phase difference φ between the load current and the load voltage on the basis of the detected load current signal and the detected load voltage signal value according to the method for calculating the electric power input amount Pw with the above expression. In particular, it is very difficult to obtain the accurate phase difference φ from the effective load current Id0 and the effective load voltage Vd0 associated with a higher frequency and a higher voltage. Thus, according to the above-mentioned control method, the electric power input amount Pw is provided with a low accuracy, and it is therefore difficult to keep the electric power input amount Pw constant.

The inventors noted the one-to-one correspondence between the amount of alternating-current electric power input from the power supply apparatus 10 to the plasma generator 5 and the amount of direct-current electric power input to the inverter 3 in the power supply apparatus 10. That is, once the direct-current electric power amount at a low voltage in the power supply apparatus 10, aside from the high voltage portion of the load, is determined, the amount of electric power input is uniquely given in accordance with the direct-current electric power amount (and vice versa). Thus, it was noted that the direct-current electric power amount is controlled to be constant at the desired value of the direct-current electric power amount, and accordingly the amount of electric power input to the plasma generator 5 is controlled to be constant at the desired electric power input amount value.

The present embodiment provides the power supply apparatus 10 capable of keeping the electric power input amount constant through the feedforward control and the feedback control, in which the amount of direct-current electric power input to the inverter 3 in the power supply apparatus 10 is regarded as the direct control value, and stably supplying the electric power input amount to the plasma generator 5.

Firstly, the user selects the concentration of gas such as an ozone gas, which is generated in the plasma generator 5 through the plasma treatment (the selection of a desired gas concentration C). That is, the user inputs the desired concentration C of the above-mentioned gas to the power supply apparatus 10 according to the present embodiment (the user may input, instead of the desired concentration C, a target electric input amount value Po', which will be described below, as the amount of electric power input such that the gas of the desired concentration C is generated).

Then, the controller 6 calculates a target direct-current electric amount value Po in accordance with the operation conditions of the plasma generator 5 and the desired gas concentration C (or the target electric input amount value Po') (the feedforward control). As is clear from the above description, the target electric input amount value Po' is uniquely given on the basis of the target direct-current electric amount value Po. Under the above-mentioned operation conditions of the plasma generator 5, the amount of electric power input equivalent to the target electric input amount value Po' is input to the plasma generator 5, and then a gas of the desired concentration C is generated in the plasma generator 5.

Further, the controller 6 determines an inverter frequency fo or an inverter τo on the basis of the target direct-current electric amount value Po. Then, the controller 6 performs the control (feedforward control) over the output from the inverter 3 in accordance with the determined inverter frequency fo or the determined inverter pulse width τo (considered as the inverter control value). The inverter 3 is controlled in accordance with fo or τo, so that the amount of electric power input from the power supply apparatus 10 to the plasma generator 5 approaches the target electric input amount value Po'.

Next, the controller 6 detects a direct current Ii and a direct-current voltage Vi at the output portion of the direct-current voltage output unit 20. Here, a current detector 21 shown in FIG. 1 detects the direct current Ii whenever necessary and transmits the detected value to the controller 6 whenever necessary. Further, a voltage detector 22 shown in FIG. 1 detects the direct-current voltage Vi whenever necessary and transmits the detected value to the controller 6 whenever necessary. As shown in FIG. 1, the individual detectors 21 and 22 are disposed between the direct-current voltage output unit 20 and the inverter 3.

Then, the controller 6 calculates a direct-current electric amount value Pi (=Ii×Vi) on the basis of the detection results Ii and Vi. Further, the controller 6 fine-tunes the inverter frequency f or the inverter pulse width τ (considered as the inverter control value) in such a manner that a difference ΔP (=Po−Pi) between the target direct-current electric amount value Po and the direct-current electric amount value Pi becomes zero, and the controller 6 performs the control (feedback control) over the output from the inverter 3 in accordance with the inverter frequency f or the inverter pulse width τ obtained after the fine tuning.

For example, on condition that the target direct-current electric amount value Po is greater than the direct-current electric amount value Pi, the inverter frequency f is increased and/or the inverter pulse width τ is increased.

The above-mentioned control is performed such that the difference ΔP becomes zero, and consequently the amount of electric power input to the plasma generator 5 is kept constant at the target electric input amount value Po' mentioned above.

As a result of the above-mentioned control action, the power supply apparatus 10 controls the amount of electric power input to the plasma generator 5, which is the amount dependent on the desired gas concentration C selected by the user, and keeps the amount constant at the target electric input amount value Po'.

As described above, power supply apparatus 10 can change the amount of electric power input over a range of 0 to 100% of the rated power in accordance with the desired gas concentration.

The target direct-current electric amount value Po mentioned above is calculated in the following manner. That is, the controller 6 prestores tables and arithmetic expressions as data. With the tables and the arithmetic expressions, the target direct-current electric amount value Po is uniquely given and determined depending on the operation conditions of the plasma generator 5 and the desired gas concentration C.

The values indicating the operation conditions of the plasma generator 5 are a gas supply flow rate Q of the source gas, a pressure P in the discharge cell, a flow rate Qw of the refrigerant flowing through the plasma generator 5, and a temperature Tw of the refrigerant (the physical quantities described in the embodiment 1). The controller 6 acquires, as input data, these values Q, P, Qw, and Tw, which indicate the operation conditions of the plasma generator 5, from the plasma generator 5 through the external signal interface 63.

The controller 6 calculates the target direct-current electric amount value Po by applying, as the data for the tables and the arithmetic expressions mentioned above, the above-mentioned acquired values Q, P, Qw, Tw, and the desired gas concentration C selected and input by the user.

The controller 6 also presets and prestores, as data, the value of the inverter frequency fo or the value of the inverter pulse width τo, these values being uniquely specified with respect to the target direct-current electric amount value Po. As mentioned above, the controller 6 can uniquely determine the inverter frequency fo or the inverter pulse width τo with respect to the calculated target direct-current electric amount value Po. As described above, the inverter 3 is controlled in accordance with fo or τo, so that the amount of electric power input from the power supply apparatus 10 to the plasma generator 5 is approximated to the target electric input amount value Po' (fo and τo are values based on theory, and thus are not equal to the target electric input amount Po').

On condition that each of the above-mentioned values Q, P, Qw, and Tw is constant, the amount of electric power input is kept constant at the target electric input amount value Po' (the amount of direct-current electric power input to the inverter 3 is kept constant at the target direct-current electric amount value Po), whereby the gas of the constant desired concentration C mentioned above is generated in the plasma generator 5

The above description has been given on the detection of the direct current Ii and the direct-current voltage Vi at the output portion of the direct-current voltage output unit 20 through the feedback control. If the output voltage from the direct-current voltage output unit 20 is controlled to be a constant voltage, meanwhile, the electric input amount value Pi (=Ii×constant voltage) can be calculated by detecting only the direct current Ii at the output portion of the direct-current voltage output unit 20 through the feedback control. That is, the amount of electric power input from the power supply apparatus 10 can be controlled to be constant at the target electric input amount value Po' by performing the feedback control and detecting only the direct current Ii at the output portion of the direct-current voltage output unit 20.

As described above, in the present embodiment, the controller 6 performs the feedforward control (the calculation of the target direct-current electric amount value Po, the determination of the inverter frequency or the inverter pulse width τo through the use of the target direct-current electric amount value Po, and the control over the inverter 3 through the use of the inverter frequency fo or the inverter pulse width τo) and the feedback control (the fine-tuning of the inverter frequency f or an inverter pulse width through the use of the target direct-current electric amount value Po and the actual detection results (including at least the detection results on the direct current) at the output portion of the direct-current voltage output unit 20 and the control over inverter 3 through the use of the inverter frequency f or the inverter pulse width τ obtained after the fine tuning).

That is, in the present embodiment, the power supply apparatus 10 detects the direct-current output results from the direct-current voltage output unit 20, and the controller 6 performs the feedback control through the use of the detection results and the target direct-current electric amount value Po being the control value such that the electric power input amount is kept constant at the target electric input amount value Po' (such that the direct-current electric amount input to the inverter 3 is kept constant at the target direct-current electric amount value Po), thus fine-tuning the inverter frequency f or the inverter pulse width τ.

The feedback control is performed through the use of, for example, the direct current that is smaller than the load current or the like, and the direct current or the like and the amount of direct-current electric power input to the inverter 3 (in other words, the amount of electric power input) are in one-to-one correspondence (the amount of electric power input is regarded as the direct control amount value). The amount of electric power input is thus controlled, with a high accuracy, to be constant at the target electric input amount value Po' in accordance with the desired gas concentration. Unlike the load current and the like, the detected direct current and the like do not carry, for example, noises (the noises being caused by the inverter 3 and the transformer 4). Again, the amount of electric power input is thus controlled, with a high accuracy, to be constant at the target electric input amount value Po' in accordance with the desired gas concentration. Thus, the power supply apparatus can continue to supply the plasma generator 5 with the stable electric power.

In the present embodiment, the controller 6 may omit a part of the above-mentioned feedforward control and perform the above-mentioned feedback control to control the inverter 3 such that the amount of electric power input is kept constant at the target electric input amount value Po'.

That is, as described above, the controller 6 calculates the target direct-current electric amount value Po. Immediately afterward, the controller 6 performs the feedback control through the use of the detection results on the direct current or the like, determines the inverter frequency f or the inverter pulse width τ, and brings the amount of direct-current electric power input to the inverter 3 in agreement with the target electric input amount value Po (in other words, brings the amount of electric power input in agreement with the target direct-current electric input amount value Po'). In this way, the determination of the inverter frequency fo or the inverter pulse width τo and the control over the inverter 3 through the use of the inverter frequency fo or the inverter pulse width τo may be omitted. However, such a control may reduce the responsivity, so that much time may be required for the amount of electric power input to reach the target value.

Thus, as described above, the following action is performed. That is, through the feedforward control, the inverter 3 is controlled in accordance with the inverter frequency fo or the inverter pulse width τo and the amount of electric power input is brought close to the target electric input amount value Po' (the amount of the direct-current electric power is brought close to the target direct-current electric amount value Po). Then, through the feedback control, the inverter frequency f or the inverter pulse width τ is fine-tuned and the inverter 3 is controlled in accordance with the inverter frequency for the inverter pulse width τ.

The feedforward control and the feedback control are combined in the stated order, allowing the amount of electric power input to reach the target electric input amount value Po' in a short time.

The controller 6 may change both or one of the inverter frequency and the inverter pulse width, and accordingly controls the amount of electric power input to be equal to the target electric input amount value Po' (controls the amount of the direct-current electric power to be equal to the target direct-current electric amount value Po).

The controller 6 that performs the feedforward control and the feedback control described in the present embodiment is applicable to the power supply apparatus 10 according to any one of the embodiments 1 to 4 mentioned above and is also applicable to the power supply apparatus 10 obtained by combining all of the embodiments.

For example, the power supply apparatus 10 may omit the current-limiting reactor described in the embodiment 1 and include the controller 6 and the inverter 3 that perform the action described in the present embodiment is performed.

Alternatively, the power supply apparatus 10 may include, instead of the transformer 4 having the configuration described in the embodiment 2, the common transformer 4 as well as the controller 6 and the inverter 3 that perform the action described in the present embodiment.

That is, apart from the respective embodiments described above, the power supply apparatus 10 may implement, by itself, the configuration (the configuration for performing the feedforward control and the feedback control) described in the present embodiment.

As described in the above-mentioned embodiments, in a case where the power supply apparatus 10 (more specifically, the inverter 3) is driven at the constant resonance, the feedforward control and the feedback control may be performed, with only the inverter pulse width being variable, such that the amount of electric power input reaches the target electric input amount value Po'.

Embodiment 6

With reference to FIG. 4 mentioned above, the waveform shown on the top column is the alternating-current voltage waveform that is output from the inverter 3 and has a rectangular shape. The rectangular alternating-current voltage waveform through the transformer 4 causes a sinusoidal high frequency and a sinusoidal high voltage to be supplied to the plasma generator 5. Here, the amount of production (the concentration) of the gas or the like generated in the plasma generator 5 increases with increasing amount of electric power supplied to the plasma generator 5.

That is, the amount of electric power supplied from the power supply apparatus 10 to the plasma generator 5 is closely related with the concentration and the like of the gas generated in the plasma generator 5. Thus, for the stable control over the concentration of the gas generated in the plasma generator 5, it is important to keep the above-mentioned amount of electric power to be constant by controlling the inverter frequency f (the pulse cycle=1/f) or the inverter pulse width τ being the control value for the inverter 3 shown in FIG. 4. Here, the amount of electric power is controlled to be constant as described in an embodiment 5.

The load impedance (the concentration of the generated gas) in the plasma generator 5 changes depending on not only the amount of electric power supplied from the power supply apparatus 10 but also the conditions of the load in the plasma generator 5 (the above-mentioned "operation conditions of the plasma generator 5"). Here, as described above, the values indicating the operation conditions of the plasma generator 5 are the gas supply flow rate Q of the source gas, the pressure P in the discharge cell, the flow rate Qw of the refrigerant flowing through the plasma generator 5, and the temperature Tw of the refrigerant.

For the stable driving of the plasma generator 5, the above-mentioned values Q, P, Qw, and Tw that indicate the operation conditions of the plasma generator 5 need to be managed in such a manner that the respective values hardly vary (are kept substantially constant). However, in actuality, it is difficult to keep the above-mentioned values Q, P, Qw, and Tw substantially constant because the respective values Q, P, Qw, and Tw change or greatly vary, in some cases, due to the disturbance caused by, for example, noises superimposed on signal lines.

Thus, as described in the embodiment 1, the controller 6 imports, all the time, the above-mentioned values Q, P, Qw, and Tw that indicate the operation conditions of the plasma generator 5 through the transmission and receipt performed between the power supply apparatus 10 and the plasma generator 5. The controller 6 controls the inverter frequency f (the pulse cycle=1/f) or the inverter pulse width τ being the control value for the inverter 3 in accordance with the respective values Q, P, Qw, and Tw such that the above-mentioned electric amount is controlled to be constant at the appropriate value.

The plasma generator 5 is a capacitive load and usually has a very low load power factor. To improve the power factor, the resonance means for creating the resonance state between the power supply apparatus 10 and the plasma generator 5 is disposed in the power supply apparatus 10 and the driving frequency (the working frequency) of the inverter 3 is set at around the resonance frequency. The technique for improving the power factor may be the invention according to the embodiment 2 or may be the series-resonance mode power factor improvement means and the parallel-resonance mode power factor improvement means that have been described in the embodiment 2.

The power supply device 10 according to the present embodiment includes any one of the power factor improvement means mentioned above. The power supply apparatus 10 has the function of automatically determining the driving frequency of the inverter 3. That is, the power supply apparatus 10 has the function of automatically searching for the resonance frequency.

Firstly, the controller 6 sets the amount of electric power input, the initial power-supply output frequency, the set gas flow rate, the set gas pressure, the set refrigerant temperature, the set refrigerant flow rate, and the like. The set gas flow rate, the set gas pressure, the set refrigerant temperature, and the set refrigerant flow rate are output from the controller 6 to the MFC, the APC, and the like in the plasma generator 5 through the external signal interface 63.

As described in the embodiment 1, while the plasma generator 5 is in operation, the gas supply flow rate Q of the source gas, the pressure P in the discharge cell, the flow rate Qw of the refrigerant flowing though the plasma generator 5, and the temperature Tw of the refrigerant that are measurement values (the respective physical quantities being the measurement values) are always transmitted from the plasma generator 5 to the controller 6 through the external signal interface 63.

Then, as described in the embodiment 1, the controller 6 determines whether the gas supply flow rate Q falls within the desired range relative to the set gas flow rate, whether the pressure P in the discharge cell falls within the desired range relative to the set gas pressure, whether the flow rate Qw of the refrigerant falls within the desired range relative to the set refrigerant flow rate, and whether the temperature Tw of the refrigerant falls within the desired range relative to the set refrigerant temperature.

Upon determining the occurrence of abnormalities associated with the respective physical quantities in the plasma generator 5 on the basis of the respective determination results, the controller 6 deals with the abnormalities by, for example, stopping the output from the inverter 3 as described in the embodiment 1. Further, the controller 6 notifies that the abnormality has occurred in the plasma generator 5 (which one of the physical quantities is abnormal) to the outside.

In the absence of any abnormality in the plasma generator 5 so far, the controller 6 uses the voltage value and the current value measured in the power supply apparatus 10 to determine whether any short circuit has occurred in the load (refer the description given with reference to FIGS. 2 and 3).

Upon determining the occurrence of any short circuit on the basis of the determination results, the controller 6 stops the output from the inverter 3 as described in the embodiment 1. Further, the controller 6 makes a notification of any abnormal spot that causes a short circuit to the outside.

In the absence of any abnormality or any short circuit so far, the controller 6 determines whether the action of the components in the power supply apparatus 10 is abnormal or normal. Upon determining any abnormality in the action of the components on the basis of the determination results, the controller 6 stops the output from the inverter 3. Further, the controller 6 makes a notification of any component which has been determined to be abnormal to the outside.

In a case where the normality is determined in the respective determinations so far, the following action is performed. Here, the controller 6 may omit the action associated with the respective determinations made so far, and start from the following action (the characteristic technique according to the present embodiment).

The controller 6 sets the above-mentioned amount of electric power input, and then the controller 6 determines whether the amount of electric power input is the electric power value equivalent to 100% of the rated power of the power supply apparatus 10 or the controller 6 determines whether the amount of electric power input is the electric power value equal to or more than the threshold value % and equal to or less than 100% of the rated power of the power supply apparatus 10. Here, the threshold value % is preset in the controller 6. In a case where the threshold value % is 90%, the controller 6 determines whether the amount of electric power input is equal to or more than 90% and equal to or less than 100% of the rated power of the power supply apparatus 10.

The action described below is the action of determining the driving frequency of the inverter 3 during the operation of the power supply at the maximum capacity (or during the operation of the power supply at a capacity close to the maximum capacity) and is, after all, the action of setting conditions. Thus, in the initial action stage after the implementation of the system by connecting the plasma generator 5 to the power supply apparatus 10, in general, the controller 6 is firstly instructed to set the amount of electric power input that is equal to 100% of the rated power or is equal to or more than the threshold value % and equal to or less than 100% of the rated power.

In a case where the electric power input amount according to the above-mentioned setting instruction is equal to 100% of the rated power of the power supply apparatus 10 (or is equal to or more than the threshold value % and equal to or less than 100% of the rated power of the power supply apparatus 10), the controller 6 changes the inverter frequency f being the control value for the inverter 3 whenever necessary, and accordingly controls the output from the inverter 3 on the basis of each of the inverter frequencies f.

Here, the controller 6 causes the inverter frequency f to change (sweep) over the predetermined frequency range (for example, a range of ±2 kHz) with the initial power-supply output frequency set as described above being at the center. Alternatively, the inverter frequency f may be caused to sweep across the entire frequency range. If the sweep range is limited as described above, the time required to find the resonance frequency can be reduced.

In the implementation stage of the system by connecting the power supply apparatus 10 and the plasma generator 5, the resonance frequency at the theoretical value is calculated from Expression (1) mentioned above (the combined inductance of the power supply apparatus 10 downstream from the output side of the inverter 3 is denoted by L in Expression (1) and the combined capacitance of the plasma generator 5 is denoted by C in Expression (1). With a view toward reducing the time required to find the resonance frequency, the value calculated from Expression (1) is set for the controller 6 as the initial power-supply output frequency mentioned above and the controller 6 causes the inverter frequency f to change (sweep) over the predetermined frequency range with the initial power-supply output frequency being at the center (for example, causes the inverter frequency f to change discretely).

In changing the inverter frequency f, the controller 6 also changes the inverter pulse width τ in accordance with changes in the inverter frequency f so as to satisfy the electric power input amount according to the setting instruction, and then transmits the inverter pulse width τ as the control value to the inverter 3.

The controller 6 changes the inverter frequency f and obtains the inverter output power factor for each of the inverter frequencies f on the basis of the electricity amount acquired from the detection units 31 and 32. The electricity amount refers to the value associated with the electricity on the output side of the inverter 3, the electricity being used to obtain the inverter output power factor.

In particular, the current detector 31 shown in FIG. 1 detects the effective current value at the output unit of the inverter 3 for each of the inverter frequencies f subjected to the sweep, and then transmits the detection results to the controller 6. The voltage detector 32 shown in FIG. 1 detects the effective voltage value at the output unit of inverter 3, and then transmits the detection results to the controller 6. The controller 6 obtains the active power at the output unit of the inverter 3 from the above-mentioned effective current value and the above-mentioned effective voltage value for each of the inverter frequencies f subjected to the sweep.

Then, through the use of the above-mentioned effective current value, the above-mentioned effective voltage value, and the above-mentioned active power, the controller 6 computes the inverter output power factor η at the output unit of the inverter 3 for each of the inverter frequencies f subjected to the sweep. Here, assume that the inverter output power factor η={(active power)/(effective current value× effective voltage value)}×100(%).

Figure 16:
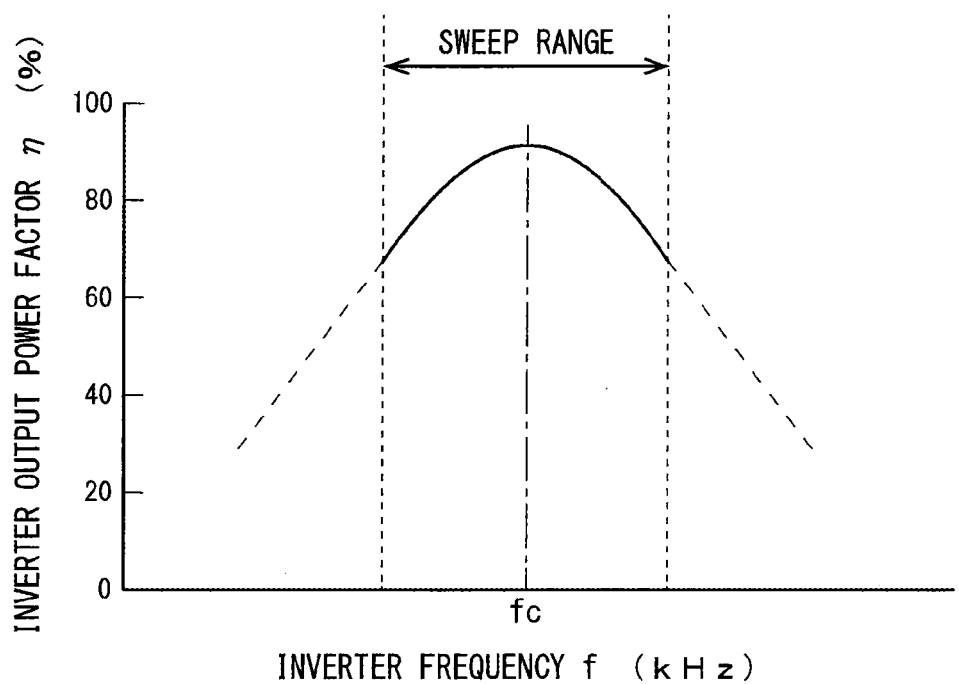
FIG. 16 A diagram showing characteristics of an inverter output power factor η relative to an inverter frequency f.

FIG. 16 is a diagram showing the state in which the inverter frequency f is caused to change (sweep) in the predetermined frequency range and the inverter output power factor 11 obtained for each of the inverter frequencies f changes. The vertical axis of FIG. 16 indicates the inverter output power factor η (%) and the lateral axis of FIG. 16 indicates the inverter frequency f (kHz).

As shown in FIG. 16, the inverter output power factor 11 is obtained for each of the inverter frequencies subjected to the sweep, and then the controller 6 detects a maximum inverter output power factor ηmax that is the maximum value among the obtained inverter output power factors η. Then, the controller 6 determines, as the driving frequency fc of the inverter 3, the inverter frequency (being the resonance frequency fc, see fc in FIG. 16) obtained at the maximum inverter output power factor ηmax.

After determining the driving frequency fc, the controller 6 transmits the driving frequency fc as the inverter frequency f to the inverter 3. Further, the controller 6 transmits, to the inverter 3, an inverter pulse width τc determined on the basis of the driving frequency fc and the electric power input amount that has been set as described above.

Consequently, a high-frequency waveform based on the driving frequency fc and the inverter pulse width τc is output from the inverter 3, and the load power corresponding to the electric power input amount that has been set as described above is supplied to the plasma generator 5.

In some cases, the user needs to change the concentration of the gas generated in the plasma generator 5 or to change the above-mentioned values (the respective physical quantities) Q, P, Qw, and Tw that indicate the operation conditions of the plasma generator 5 while keeping the concentration of the generated gas unchanged. In such a case, the user changes the amount of electric power input from the power supply apparatus 10 in accordance with the desired amount of change.

Assume that the user accordingly changes the electric power input amount set to the power supply apparatus 10.

In response to the change, the controller 6 determines whether the changed amount of the electric power input is equivalent to the electric power input value that is less than 100% of the rated power of the power supply apparatus 10 or the controller 6 determines whether the changed amount of the electric power input is equivalent to the electric power input value that is less than the above-mentioned threshold value % of the rated power of the power supply apparatus 10.

Here, assume that the changed amount of electric power input is less than 100% of the rated power (or less than the above-mentioned threshold value % of the rated power). The controller 6 accordingly determines that the changed amount of electric power input is less than 100% of the rated power (or less than the above-mentioned threshold value % of the rated power) of the power supply apparatus 10.

Thus, the controller 6 transmits the driving frequency fc as the inverter frequency f to the inverter 3. In other words, the inverter frequency f is fixed at the driving frequency fc mentioned above even if the instructions to change the amount of electric power input are given. Further, the controller 6 transmits, to the inverter 3, an inverter pulse width τr determined on the basis of the changed amount of electric power input and the driving frequency fc.

Consequently, a high-frequency waveform based on the driving frequency fc and the inverter pulse width τr is output from the inverter 3, and the load power corresponding to the changed amount of electric power input is supplied to the plasma generator 5.

From that point forward, even if the power supply apparatus 10 is instructed to change the amount of electric power input, the controller 6 continues to fixedly output the driving frequency fc as the inverter frequency f to the inverter 3 as long as the changed amount of electric power input is less than 100% of the rated power (or less than the above-mentioned threshold value % of the rated power). The inverter pulse width τ is changed as occasion arises in accordance with the changed amount of electric power input.

There is a possibility that the changed amount of electric power input is equal to 100% of the rated power (or is equal to or more than the above-mentioned threshold value % and equal to or less than 100% of the rated power). In this case, the power supply apparatus 10 performs the following action.

The power supply apparatus 10 includes a switching unit (not shown in FIG. 1 and the like) capable of selecting whether to redetermine the resonance frequency obtained as described above.

Once the system including the power supply apparatus 10 and the plasma generator 5 is implemented, the resonance frequency can hardly change. The user accordingly operates the switching unit to select the inexecution of redetermination of the driving frequency.

In this case, the controller 6 transmits, as the inverter frequency f, the driving frequency fc obtained as described above to the inverter 3. That is, even if the amount of electric power input equal to 100% of the rated power (or the amount equal to or more than the above-mentioned threshold value % and equal to or less than 100% of the rated power) is instructed and set again, the inverter frequency f is fixed at the driving frequency fc mentioned above. Further, the controller 6 transmits, to the inverter 3, the inverter pulse width τc determined on the basis of the driving frequency fc and the electric power input amount that has been set as described above.

Consequently, a high-frequency waveform based on the driving frequency fc and the inverter pulse width τc is output from the inverter 3, and the load power corresponding to the electric power input amount that has been set as described above is supplied to the plasma generator 5.

Meanwhile, the resonance frequency is changed in a case where: the plasma generator 5 has been used for a long period of time; the plasma generator 5 or the power supply apparatus 10 has undergone design changes or the like; changes have been made to wires connecting the plasma generator 5 and the power supply apparatus 10 or to wires inside the plasma generator 5 and the power supply apparatus 10. Thus, there is a possibility that the user operates the switching unit to select the execution of redetermination of the driving frequency.

In this selection, if the changed amount of electric power input is equal to 100% or the rated power (or is equal to or more than the above-mentioned threshold value % and equal to or less than 100% of the rated power), the power supply apparatus 10 again performs the action of determining the driving frequency in response to the setting of the amount of electric power input (the action being similar to the action of causing above-mentioned sweep of the inverter frequency and obtaining the inverter frequency (the resonance frequency) at the maximum inverter output power factor ηmax). Assuming that a driving frequency fc' is determined as a result of the determination action, from that point forward, the controller 6 replaces the above-mentioned driving frequency fc with the new driving frequency fc' and performs the action same as the action described above in response to any change in the electric power input amount set to the power supply apparatus 10 (the action being similar to the action of the controller 6 that continues to fixedly output the driving frequency as the inverter frequency f to the inverter 3 in response to any change in the electric power input amount).

The output from the inverter 3 is controlled based on the above-mentioned driving frequencies fc and fc' as well as the inverter pulse width obtained as described above. Here, the controller 6 may fine-tune the inverter pulse width through, for example, the feedback control described in the embodiment 5 such that the amount of electric power input is controlled with a high accuracy.

As described above, after the implementation of the system including the power supply apparatus 10 and the plasma generator 5, the power supply apparatus 10 according to the present embodiment automatically determines the driving frequency fc in response to the initial instruction to set, as the amount of electric power input, the value equal to 100% of the rated power or the value equal to or more than the threshold value % and equal to or less than 100% of the rated power.

Thus, during the operation of the power supply at the maximum capacity (or during the operation of the power supply at a capacity close to the maximum capacity), the power supply apparatus 10 can be driven at the driving frequency (resonance frequency) fc with the improved inverter output power factor Here, the driving frequency fc is automatically provided depending on models of the plasma generators 5 and production lot variations.

In the power supply apparatus 10 according to the present embodiment, after the driving frequency fc is obtained, the controller 6 fixedly outputs, to the inverter 3, the driving frequency fc obtained as described above in response to the instruction to set, as the amount of electric power input, the value less than 100% of the rated power or the value less than the threshold value % of the rated power, and accordingly.

This prevents the action of obtaining the driving frequency every time the amount of electric power input is changed, thus preventing deterioration of the processing performance of the power supply apparatus 10.

Even if the amount of electric power input is changed, there is not much difference between the true resonance frequency corresponding to the amount of electric power input and the previously obtained driving (resonance) frequency fc. Due to the difference between the true resonance frequency and the previously obtained driving (resonance) frequency fc, the inverter output power factor η becomes somewhat smaller than the maximum inverter output power factor ηmax.

In a case where the amount of electric power input is less than 100% of the rated power or is less than the threshold value % of the rated power, meanwhile, the power supply apparatus 10 has a capacity in reserve. Assuming that the amount of electric power input is less than 100% of the rated power or less than the threshold value % of the rated power, the controller 6 possibly controls the inverter 3 at the driving frequency fc mentioned above, and accordingly the inverter output power factor η could be somewhat smaller than the maximum inverter output power factor ηmax, but the power supply apparatus 10 can operate without any problem in terms of its performance.

The power supply apparatus 10 according to the present embodiment includes the switching unit capable of making the above-mentioned selection. In the event of circumstances causing any change in the resonance frequency in the system including the power supply apparatus 10 and the plasma generator 5, the controller 6 can automatically determines the proper driving frequency once again in accordance with the user's request.

Unlike the above description, there is a possibility that the amount of electric power input according to the initial setting instruction is not equal to 100% of the rated power of the power supply apparatus 10 (or is neither equal to or more than the threshold value % nor equal to or less than 100% of the rated power of the power supply apparatus 10)

In this case, the controller 6 determines the inverter frequency f as the initial power-supply output frequency that has been set as described above. Further, the controller 6 obtains the inverter pulse width τ from the electric power input amount that has been set as described above and the initial power-supply output frequency that has been determined as described above. Then, the controller 6 transmits, to inverter 3, the set initial power-supply output frequency and the obtained inverter pulse width.

Consequently, a high-frequency waveform based on the set initial power-supply output frequency and the obtained inverter pulse width is output from the inverter 3, and the load power corresponding to the electric power input amount that has been set as described above is supplied to the plasma generator 5.

Then, the electric power input amount set for the power supply apparatus 10 is changed. When the set amount of electric power input reaches 100% of the rated power of the power supply apparatus 10 (becomes equal to or more than the threshold value % and equal to or less than 100% of the rated power of the power supply apparatus 10) for the first time, the controller 6 performs the action of obtaining the driving frequency fc mentioned above. From that point forward, the action same as the one described above is performed in response to any change in the amount of electric power input (the action being similar to, for example the action of the controller 6 that continues to fixedly output the driving frequency fc as the inverter frequency f to the inverter 3 in response to any change in the amount of electric power input).

The characteristic techniques according to the present embodiment (the automatic determination of the driving frequency, the fixed outputting of the driving frequency in response to any change in the amount of electric power input, and the like) may be combined with the above-mentioned embodiments 1 to 5. Alternatively, the power supply apparatus 10 may be certainly configured to employ the characteristic technique according to the present embodiment.

Embodiment 7

In the embodiment 6, the power supply apparatus 10 includes the power factor improvement means, causes resonances through the use of the reflection current from the load side (the plasma generator 5 side), and automatically determines the driving frequency. In the embodiment 6, the driving frequency is equivalent to the inverter frequency (in other words, the resonance frequency) at the maximum inverter output power factor ηmax.

When the impedance of the load is investigated based on the output from the transformer 4 of the power supply apparatus 10 with resonances being caused through the use of the reflection current as described above, the inductive impedance of the power factor improvement means mentioned above and the capacitive impedance on the load side cancel out each other. If the driving frequency of the power supply apparatus 10 is set at the resonance frequency fc, the above-mentioned inductive impedance and the capacitive impedance on the load side cancel out each other, providing 0Ω. Consequently, the total discharge plasma impedance (resistance) Rp0 (Ω) alone is left for the plasma generator 5.

If the number n of discharge cells connected in parallel is small, Rp0 that is inversely proportional to n has a greater value. Thus, the total load current Id0 in the plasma generator 5 is regulated, and accordingly a Q value indicating the amplification degree of resonance (in other words, the characteristic of the inverter output power factor η shown in FIG. 16) changes gently even if the inverter frequency changes, allowing for the power supply apparatus 10 to work stably at the resonance frequency.

Figure 17:
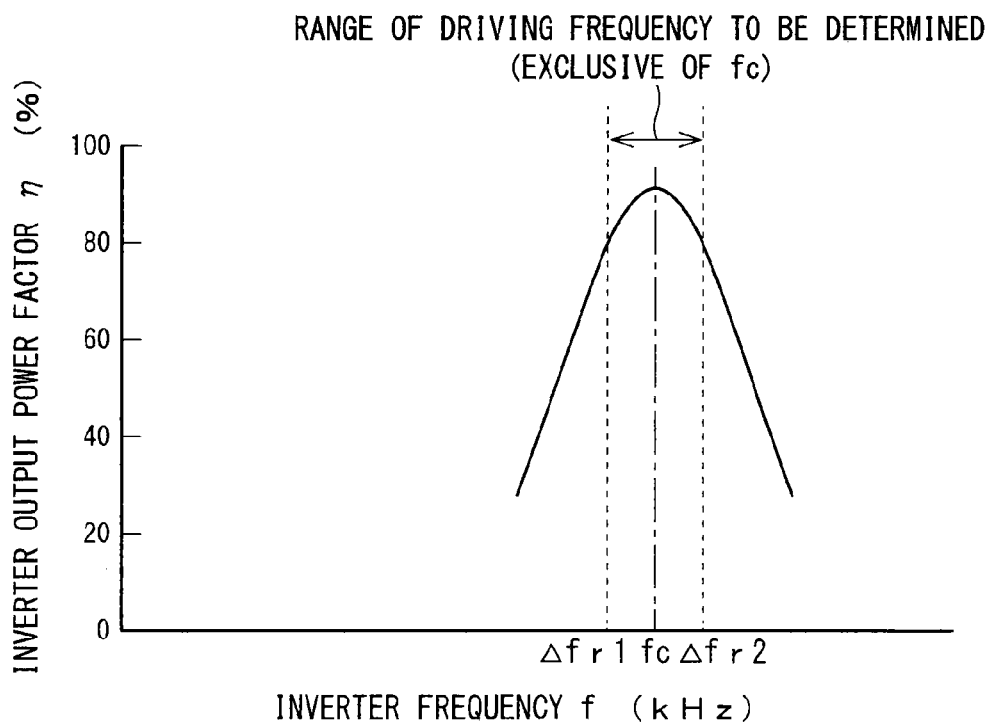
FIG. 17 A diagram showing characteristics of the inverter output power factor η relative to the inverter frequency f.

In contrast, if the number n of discharge cells connected in parallel is great or the discharge resistance of the discharge cells in the plasma generator 5 is very small, Rp0 has a very small value. Thus, the total load current Id0 in the plasma generator 5 becomes extremely great, and accordingly the Q value indicating the amplification degree of resonance (in other words, the characteristic of the inverter output power factor η shown in FIG. 17) changes steeply in response to any change in the inverter frequency. In this situation, driving the power supply apparatus 10 driven at the resonance frequency causes, not only an increase in the reflection current from the load but also a great increase in the rate of temporal change in current, thus inducing the oscillation mode in the resonance system.

The oscillation mode becomes a cause of an increase in noise in the power supply apparatus 10. Such an incase in noise causes, in some cases, electric damage to the electric components in the power supply apparatus 10, malfunctioning of the power supply apparatus 10, and breakage of the plasma generator 5.

Thus, in the present embodiment, instead of the actual resonance frequency, the resonance frequency fc is used to determine the driving frequency determined in the embodiment 6.

In particular, as in the embodiment 6, the controller 6 determines the inverter frequency (in other words, the resonance frequency fc) at the maximum inverter output power factor ηmax obtained due to the sweep of the inverter frequency. Then, the controller 6 determines the value obtained by shifting the resonance frequency fc by a micro frequency Δf as the driving frequency (=fc±Δf).

Here, the micro frequency Δf is individually determined depending on the configuration of the plasma generator 5 in the actual use. The system including the power supply apparatus 10 and the plasma generator 5 is experimentally operated in advance at around the resonance frequency fc. This experimental operation provides the determination that the resonance frequency fc is shifted positively or that the resonance frequency fc is shifted negatively. Then, this experimental operation provides the determination of the proper micro frequency Δf that allows for the stable operation. The micro frequency Δf is preset in the controller 6 before the power supply apparatus 10 starts working.

The range of the micro frequency may be determined through the experimental operation mentioned above and the determined range of the micro frequency may be preset in the controller 6. In this case, the driving frequency is determined so as to fall within the following range. For example, with the inverter frequency being shifted negatively relative to the resonance frequency fc, the lower-limit frequency value that allows for the normal operation is denoted by Δfr1. With the inverter frequency being shifted positively relative to the resonance frequency fc, meanwhile, the upper-limit frequency value that allows for the normal operation is denoted by Δfr2. In this case, any value that falls within the range given by the following expression is determined as the driving frequency. That is, fc−Δfr1≤driving frequency≤fc+Δfr2 (see FIG. 17). Note that the resonance frequency fc itself is not considered as the driving frequency in the present embodiment (see FIG. 17).

As described above, in the present embodiment, the controller 6 determines the driving frequency in such a manner that the resonance frequency fc is left out. This allows for the power supply apparatus 10 to operate stably by avoid working operation at the frequency band in which the oscillation mode can be induced.

The above description has been given on the technique for stabilizing the load output unit of the power supply apparatus 10 dedicated to the capacitive load apparatus. The unit 20 of the power supply apparatus 10 that outputs a direct-current voltage may be a converter that rectifies the commercial alternating-current voltage and transforms the voltage into a direct-current voltage or may be a battery (for example, a large-capacity battery bank configured to include a multistage or multi-parallel connection), such as a storage battery, capable of outputting a direct-current voltage.

In a case where the direct-current voltage output unit 20 is a large-capacity battery bank, the equivalent circuit in the part corresponding to the battery includes a voltage source and a capacitive capacitor. Thus, in some cases, the current reflected on the large-capacity battery bank side is subjected to the voltage amplification due to the wire reactor LN in response to the voltage output from the large-capacity battery bank, whereby an over voltage may be reflected to the large-capacity battery bank. This could interfere with the stable operation of the large-capacity battery bank.

The stable driving of the large-capacity battery bank requires a technique for preventing the reflection of an overvoltage to the large-capacity battery bank. One example of such a technique is the technique for improving the power factor through the interposed parallel reactors provided for the capacitive load as described in the embodiment 2 and the like. The similar technique is used to interpose the parallel reactors in the large-capacity battery bank. The interaction between the capacitance value in the large-capacity battery bank and the inductance value in the wire reactor portion regulates the effect that subjects the reflection current to the series resonance (voltage amplification), thereby diverting the reflected reactive current through the parallel reactors.

The power supply apparatuses 10 described in the respective embodiments mentioned above are applicable as the power supply apparatuses dedicated to the capacitive load apparatuses used in the field of semiconductor manufacturing apparatuses such as ozone generators and radical generators. Further, the power supply apparatuses 10 can be used as the power supply apparatuses for the discharge apparatuses in the field of laser apparatuses and for the capacitive load apparatuses, such as very-large-scale ozone generators used in the field of pulp breaching, the field of water treatment, or the field of chemical plant.

While the invention has been shown and described in detail, the foregoing description is in all aspects illustrative and not restrictive. It is therefore understood that numerous modifications and variations can be devised without departing from the scope of the invention. Further, the invention including only a characteristic part of the invention according to the individual embodiment mentioned above and the arbitrary combination of characteristic parts of the inventions according to the individual embodiments can be devised without departing from the scope of the invention.

The invention claimed is:

1. A power supply apparatus that outputs an alternating-current voltage to a plasma generator being a capacitive load including a plurality of discharge cells connected to one another, said power supply apparatus comprising:
    an inverter that converts direct-current electric power to alternating-current electric power;
    control circuitry that controls said inverter; and
    a current detector that detects a direct current input to said inverter,
    wherein said control circuitry
        (A) determines a target direct-current electric amount value in accordance with an external input, and
        (B) performs feedback control over said inverter on the basis of at least the direct current detected by said current detector in such a manner that an amount of the direct-current electric power input to said inverter reaches said target direct-current electric amount value.

2. The power supply apparatus according to claim 1, wherein
    a direct-current voltage input to said inverter is constant, and
    said control circuitry performs said feedback control in said (B) on the basis of only the direct current detected by said current detector in such a manner that the amount of the direct-current electric power input to said inverter reaches said target direct-current electric amount value.

3. The power supply apparatus according to claim 1, wherein said control circuitry performs said feedback control in said (B) on the basis of the direct current detected by said current detector and a direct-current voltage detected by a voltage detector in such a manner that the amount of the direct-current electric power input to said inverter reaches said target direct-current electric amount value.

4. The power supply apparatus according to claim 1, wherein said control circuitry
   (C) determines a first inverter control value in accordance with said target direct-current electric amount value, and
   (D) controls said inverter on the basis of said first inverter control value and performs said (B) after said (D).

5. The power supply apparatus according to claim 4, wherein said (B) is said feedback control performed by adjusting a second inverter control value in such a manner that the amount of the direct-current electric power input to said inverter reaches said target direct-current electric amount value.

6. The power supply apparatus according to claim 5, wherein said first inverter control value and said second inverter value comprise an inverter pulse frequency and an inverter pulse width.

7. The power supply apparatus according to claim 5, wherein said first inverter control value and said second inverter control value each comprise an inverter pulse width.

8. The power supply apparatus according to claim 1, wherein said control circuitry calculates the amount of the direct-current electric power input to said inverter on the basis of the direct current detected by said current detector and a direct-current voltage input to said inverter.

9. A power supply apparatus for outputting an alternating-current voltage to a plasma generator, said power supply apparatus comprising:
   an inverter that converts direct-current electric power to alternating-current electric power;
   a current detector that detects a direct current input to the inverter; and
   control circuitry configured to
      determine a target direct-current electric amount value in accordance with an external input,
      determine an amount of the direct-current electric power input to the inverter based on the direct current detected by the current detector, and
      control the inverter according to a difference between the amount of the direct-current electric power input to the inverter and the target direct-current electric amount value.

10. The power supply apparatus according to claim 9, wherein
   the control circuitry is configured to determine the amount of the direct-current electric power input to the inverter based on the direct current detected by the current detector and a direct-current voltage input to the inverter.

11. The power supply apparatus according to claim 10, further comprising:
   a voltage detector that detects the direct-current voltage.

12. The power supply apparatus according to claim 10, wherein
   the direct-current voltage is a predetermined fixed amount.

* * * * *

UNITED STATES PATENT AND TRADEMARK OFFICE
CERTIFICATE OF CORRECTION

PATENT NO. : 9,848,484 B2
APPLICATION NO. : 15/022798
DATED : December 19, 2017
INVENTOR(S) : Yoichiro Tabata et al.

It is certified that error appears in the above-identified patent and that said Letters Patent is hereby corrected as shown below:

On the Title Page

Item (73), the Assignee's name information is incorrect. Item (73) should read:
-- (73) Assignee: Toshiba Mitsubishi-Electric Industrial Systems Corporation, Chuo-ku (JP) --

Signed and Sealed this
Fifth Day of March, 2019

Andrei Iancu
*Director of the United States Patent and Trademark Office*